United States Patent [19]

Kitada et al.

[11] Patent Number: 5,460,583

[45] Date of Patent: Oct. 24, 1995

[54] GEAR SHIFT CONTROL SYSTEM FOR AUTOMATIC TRANSMISSION

[75] Inventors: Masahito Kitada; Mitsutoshi Abe, both of Hiroshima, Japan

[73] Assignee: Mazda Motor Corporation, Hiroshima, Japan

[21] Appl. No.: 127,158

[22] Filed: Sep. 27, 1993

[30]  Foreign Application Priority Data

Sep. 25, 1992 [JP]  Japan ................................ 4-256829

[51] Int. Cl.⁶ ................................. F16H 61/08
[52] U.S. Cl. ..................... 477/154; 477/148; 477/155
[58] Field of Search .................... 477/143, 144, 477/147, 148, 149, 153, 154, 155

[56]  References Cited

U.S. PATENT DOCUMENTS 3,823,621  7/1974  Kubo et al. ........................ 477/154
4,709,596  12/1987  Boda et al. ..................... 477/147 X

FOREIGN PATENT DOCUMENTS 62-106155  5/1987  Japan ................................ 477/155
62-106156  5/1987  Japan ................................ 477/154
62-106159  5/1987  Japan ................................ 477/155
63-214550  9/1988  Japan .

*Primary Examiner*—Richard M. Lorence
*Attorney, Agent, or Firm*—Keck, Mahin & Cate

[57]  ABSTRACT

An automatic transmission shift control system calibrates a locking speed, which is regulated by a regulating valve and at which locking of a specific frictional element is performed so as to shift an transmission gear mechanism to a specific gear, in accordance with a deviation of an input speed of rotation to the transmission from a specified input speed of rotation while shifting the transmission to the specific gear. The system further varies the calibration according to a transitional period of time which is defined from a completion of shifting to a preceding gear from which the transmission is shifted directly to the specific gear to a commencement of shifting to the specific gear subsequently to the shifting to the preceding gear.

5 Claims, 17 Drawing Sheets

GEAR SHIFT CONTROL SYSTEM FOR AUTOMATIC TRANSMISSION

BACKGROUND OF THE INVENTION

1. Field of the Invention

The present invention concerns a gear shift control system for an automatic transmission and, more specifically, concerns an improved automatic transmission gear shift control system for alleviating shift shocks of an automatic transmission.

2. Description of Related Art

In a typical automatic transmission, a gear shift is performed to unlock a frictional element which places the transmission into one of the available gears and selectively lock a frictional element which places the transmission into another one of the available gears in order to form a power or torque transmission path for the gear. In such a gear shift process, it is necessary to properly synchronize the locking of selected frictional elements for providing a selected gear with the unlocking of the frictional elements locked prior to the gear shift. In a case in which the locking and unlocking of the selected frictional elements is not properly synchronized such as, for instance, when unlocking of the selected frictional element is too fast, the torque transmission path transitionally passes through a neutral state during the gear shift. This results in an occurrence of what is called a "shooting-up of rotation" in the automatic transmission during the gear shift. The term "shooting-up of rotation" as used herein shall mean and refer to a rapid increase in the frequency of rotation. On the other hand, if locking of the selected frictional element is invoked before unlocking of the previously locked frictional element has properly progressed, the torque transmission path is locked in accordance with the locked condition of these frictional elements, so that what is called a "slump of rotation" occurs in the automatic transmission during the gear shift. The term "slump of rotation" as used herein shall mean and refer to a rapid decrease or slump in the frequency of rotation. As a result of these rapid changes in rotation, i.e., shooting-up and slump of the rotation, shift shocks are experienced.

A mechanism or system for effectively alleviating or eliminating shift shocks has been proposed in Japanese Unexamined Patent Publication No. 63-214550. In this system, the locking speed of frictional elements during a gear shift is controlled in such a way that the locking is initially speeded up or set to a high level of speed over a specified period of time (hereafter referred to as a "specified speed-up time period") and is subsequently slowed down or set to a low level of speed in order to produce a quick locking of the frictional elements in the first half of a locking phase and a slow locking of the frictional elements in the second half of the locking phase, respectively. Simultaneously, the rotational speed input to the transmission gear mechanism is detected in such a way that the specified speed-up time period over which the locking of frictional elements is speeded up is sequentially calibrated in accordance with changes of the input rotational speed. In other words, when a shooting-up of the input rotation is observed in the automatic transmission, the specified speed-up time period is prolonged so as to accelerate locking of frictional elements. On the other hand, when a slump of the input rotation is observed in the automatic transmission, the specified speed-up time period is shortened so as to decelerate the locking of the frictional elements. By repeating the prolongation and shortening of the specified speed-up time period, shooting-up or slumping of the input rotation is suppressed or prevented and shift shocks are effectively reduced or eliminated.

When the specified speed-up time period over which the locking of frictional elements is accelerated is sequentially calibrated in accordance with changes in the input speed of rotation, a gear shift, for which a sequential calibration of the specified speed-up time period must be conducted, is present. For instance, a third-to-second gear shift-down may include not only an ordinary third-to-second gear shift-down (which is hereafter referred to as an ordinary 3-2 shift-down) in which the automatic transmission changes or shifts from a normal state, in which the third gear has been established, to the second gear, but also a continuous gear shift-down from the fourth gear to the second gear via the third gear (which is hereafter referred to as a continuous 4-3-2 shift-down) which takes place over a relatively short time period. In a continuous 4-3-2 shift-down, the line pressure of hydraulic control circuit drops as a result of supplying of a large quantity of a hydraulic working oil into the frictional elements which form the third gear during the continuous 4-3-2 shift-down. Accordingly, if the continuous 4-3-2 shift-down occurs gradually over an extended time period, the application of hydraulic working oil to the frictional elements which form the third gear is completed before the beginning of the 3-2 shift-down, so that the line pressure is elevated and restored to the normal level by a pressure regulator valve of the hydraulic control circuit. Consequently, the gear shift occurs under the normal level of line pressure. However, if the continuous 4-3-2 shift-down is made quickly in a short time period, the second gear is provided while the line pressure is restored to its normal level, i.e., under a lower level of line pressure. If the specified speed-up time period over which the locking is speeded up is sequentially calibrated even when the continuous 4-3-2 shift-down occurs over a short time period in the same manner as in an ordinary 3-2 shift-down, information about a gear shift performed with a different line pressure is obtained and, as a result, it may become impossible to sequentially calibrate the specified speed-up time period properly.

SUMMARY OF THE INVENTION

It is an object of the present invention to provide a gear shift control system for an automatic transmission which constantly and effectively alleviates shift shocks by properly executing a sequential calibration of a specified speed-up time period over which locking of frictional elements, which form a specific gear, is speeded up. The sequential calibration is properly executed regardless of whether a gear shift for which the sequential calibration of a specified speed-up time period is conducted is an ordinary gear shift or a quick continuous 4-3-2 gear shift.

The object of the present invention mentioned above is achieved by providing an automatic transmission gear shift control system in which the sequential calibration of a specified speed-up time period is altered depending upon gear shift modes. These gear shift modes include an ordinary gear shift and a quick continuous gear shift. The gear shift control system for an automatic transmission includes a transmission gear mechanism which has a plurality of frictional elements. The frictional elements are selectively locked and unlocked by a hydraulic circuit so as to selectively shift the transmission gear mechanism to a plurality of gears. The system includes a speed sensing means for monitoring an input speed of rotation of the transmission gear mechanism, a regulating means disposed in the hydraulic circuit for regulating a locking speed at which locking of a specific one of the frictional elements is performed so as to shift the transmission gear mechanism to a specific one of the gears such as, for instance, a second gear, and a control means. The control means controls the regulating means so as to speed up the locking of the specific frictional element for a specified period of time. The control means further calibrates the specified period of time in accordance with a deviation of the input speed of rotation from a specified input speed of rotation of the transmission gear mechanism while shifting the transmission gear mechanism to the specific gear. This calibrated specified period of time is used for another shift to the specific gear. The control means varies or prohibits the calibration of the specified period of time according to a transitional shift period of time. This transitional shift period of time is defined between the completion of shifting from a preceding gear from which the transmission gear mechanism is shifted directly to the specific gear and the commencement of shifting to the specific gear subsequently to the shifting to the preceding gear. In other words, the control means varies or prohibits the calibration of the specified period of time when the transitional shift period of time is shorter or longer than a predetermined period of time.

More specifically, the control means prohibits a corrective time for the calibration of the specified period of time when the transitional shift period of time is longer than the predetermined period of time. Otherwise, the control means may vary a corrective time for the calibration of the specified period of time when the transitional period of time is shorter than the predetermined period of time. Further, the control means may vary a line pressure supplied to the specific frictional element according to the transitional shift period of time.

In an automatic transmission gear shift control system which is so constructed, if shooting-up of rotation occurs such that an input speed of rotation of the transmission gear mechanism is higher than the target speed of rotation, i.e., when the locking speed of a specific frictional element is slow, the specified speed-up time period, over which locking is accelerated, is sequentially calibrated or changed so that it becomes longer for every occurrence of a shooting-up of rotation. On the other hand, if a slump of rotation occurs such that the input speed of rotation of the transmission gear mechanism is lower than the target speed of rotation, i.e., when the locking speed of the frictional elements is fast, the specified speed-up time period is sequentially calibrated or changed so that it becomes shorter for every occurrence of a slump of rotation.

In this instance, the sequential calibration of the specified speed-up time period is altered between when it is conducted in an ordinary 3-2 shift-down and when it is conducted in a continuous 4-3-2 shift-down invoked within a short period. As a result, the specified speed-up time period can be sequentially calibrated properly. Consequently, the specified speed-up time period for accelerating the locking of the specific frictional element is brought closer to the optimal value each time a gear shift is conducted so that during subsequent gear shifts, shooting-up and/or slumping of input rotation of the transmission gear mechanism can be sufficiently suppressed or prevented, thereby effectively alleviating or eliminating shift shocks in the automatic transmission.

If a continuous gear shift is invoked quickly, sequential calibration of the specified speed-up time period is prohibited and, accordingly, the sequential calibration of specified speed-up time period can be performed properly during a normal gear shift. Furthermore, in the event that a continuous gear shift is invoked quickly, since a correction time for the sequential calibration of the specified speed-up time period is changed, shooting-up and/or slumping of input rotation of the transmission gear mechanism can be sufficiently suppressed or prevented even during this quick continuous gear shift. This effectively alleviates or eliminates shift shocks in the automatic transmission.

Moreover, although, in general, a line pressure of the hydraulic control circuit is different in a normal gear shift than in a quick continuous gear shift, with the automatic transmission gear shift control system of the present invention, since the line pressure is altered between these two gear shift modes, shooting-up and/or slumping of input rotation of the transmission gear mechanism can be sufficiently suppressed or prevented during any gear shift which is subjected to the sequential calibration of the specified speed-up time period regardless of the state of the line pressure.

BRIEF DESCRIPTION OF THE DRAWINGS

The above and other objects and features of this invention will be clearly understood from the following description of preferred embodiments thereof when considered in conjunction with the accompanying drawings, in which.

DETAILED DESCRIPTION OF THE PREFERRED EMBODIMENTS

Figure 1:
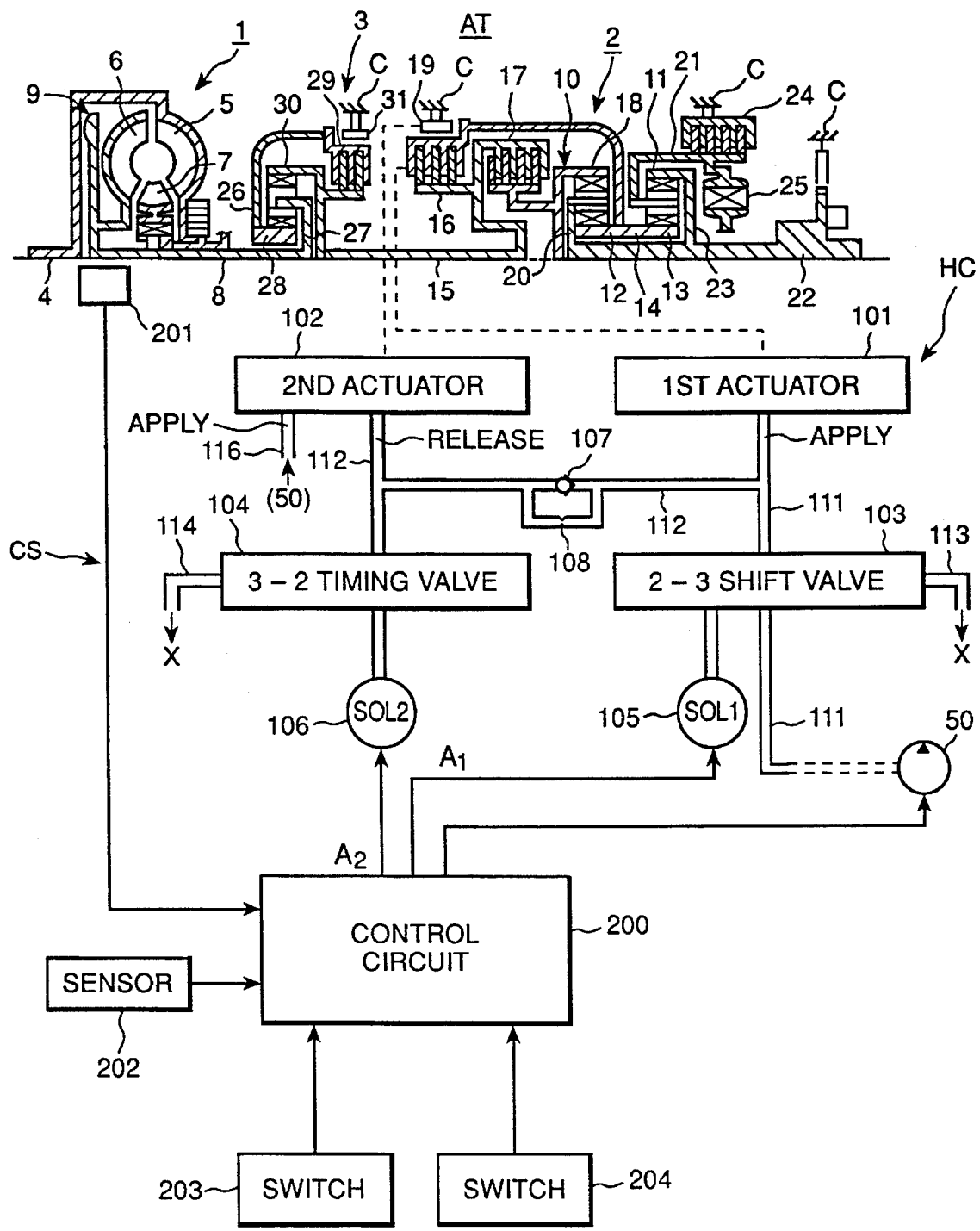
FIG. 1 is a schematic illustration of an automatic transmission cooperating with a gear shift control system in accordance with a preferred embodiment of the present invention.

Referring to the drawings in detail and, in particular, to FIG. 1, an automatic transmission AT cooperating with a gear shift control system CS in accordance with a preferred embodiment of the present invention is shown. The transmission AT includes a torque converter 1 and a transmission gear mechanism 2 which selectively creates a plurality of torque transmission paths to define gears, such as a fourth gear, a third gear, a second gear and first gear. A planetary gear mechanism 3 for overdrive control is disposed between the torque converter 1 and transmission gear mechanism 2. This torque converter 1 has a pump impeller (which is hereafter referred to simply as a pump) 5 connected to an engine output shaft 4 such as a crankshaft, a turbine runner (which is hereafter referred to simply as a turbine) 6 disposed so that it faces the pump 5, and a stator 7 disposed between the pump 5 and turbine 6. A converter output shaft 8 is connected to the turbine 6. Between the converter output shaft 8 and pump 5 there is provided a lock-up clutch (LUCL) 9 which is ordinarily urged so as to lock-up under the pressure of working oil circulated within the torque converter 1. The lock-up clutch 9 is kept unlocked when an unlock pressure provided by working oil is applied thereinto.

The transmission gear mechanism 2 has a preceding or front planetary gear mechanism 10 and a following or rear planetary gear mechanism 11. A sun gear 12 of the front planetary gear mechanism 10 and a sun gear 13 of the rear planetary gear mechanism 11 are linked via a linking shaft 14. An input shaft 15 of the transmission gear mechanism 2 is linked to the linking shaft 14 via a front clutch 16 and to an internal gear 18 of the front planetary gear mechanism 10 via a rear clutch (RCL) 17. Between the linking shaft 14, i.e., the sun gears 12 and 13, and a transmission case C, a second brake (2nd BR) 19 is provided. The second brake 19 is used for providing a specific gear stage, or "gear" such as, for example, a second gear in this embodiment. A planetary carrier 20 of the front planetary gear mechanism 10 and an internal gear 23 of the rear planetary gear mechanism 11 are linked to an output shaft 22 of the transmission gear mechanism 2. Between a planetary carrier 21 of the rear planetary gear mechanism 11 and the transmission case C, a low-reverse brake (LRBR) 24 and a one-way clutch (OWCL) 25 are provided. This transmission gear mechanism 2 is identical in mechanical structure to the same type of conventional transmission gear mechanisms and may have any mechanical structure well known to those skilled in the art.

The transmission gear mechanism 2 can provide three forward gears and one reverse gear. Any desired gear can be created by selectively locking and unlocking various frictional elements, such as a front clutch (FCL) 16, a rear clutch 17, a second brake 19, and a low-reverse brake (LRCL) 24 with the aid of hydraulic actuators, which will be described in detail later.

The overdrive planetary gear mechanism 3 has a planetary carrier 27, which is supported for rotation on the converter output shaft 8, housing 26, and a sun gear 28 coupled with an internal gear 30 via a direct clutch (DRCL) 29. An overdrive brake (ODBR) is provided between the sun gear 28 and the transmission case C. An internal gear 30 is linked to the input shaft 15 of the transmission gear mechanism 2. This overdrive planetary gear mechanism 3 serves to directly couple the converter output shaft 8 and input shaft 15 when an overdrive brake 31 is unlocked as a result of locking the direct clutch 29 and to overdrive couple the shafts 8 and 15 when the direct clutch 29 is subsequently unlocked as a result of locking of the overdrive brake 31.

Shifting of the automatic transmission AT to any desired gear is achieved by manually operating a select valve of a hydraulic circuit HC (which will be described in detail later), thereby activating the selected frictional elements, such as clutches and brakes, of the transmission gear mechanism 2 and the overdrive planetary gear mechanism 3. Actuation patterns of the frictional elements are specified as shown in the following Table for each gear and range in the same manner as those of conventional transmissions.

TABLE

|  | RCL | FCL | LUCL | DRCL | LRCL | 2ndBR | ODBR | OWCL |
| --- | --- | --- | --- | --- | --- | --- | --- | --- |
| P Range |  |  |  | o |  |  |  |  |
| R Range | o |  |  | o | o |  |  |  |
| N Range |  |  |  | o |  |  |  |  |
| Drive Range |  |  |  |  |  |  |  |  |
| 1st Gear | o |  |  | o |  |  |  | o |
| 2nd Gear | o |  | o | o |  | o |  |  |
| 3rd Gear | o | o | o | o |  |  |  |  |
| 4th Gear | o | o | o |  |  |  | o |  |
| 2nd Range | o |  |  | o |  | o |  |  |
| 1st Range |  |  |  |  |  |  |  |  |
| 1st Gear | o |  |  | o | o |  |  |  |
| 2nd Gear | o |  |  | o |  | o |  |  |

The hydraulic circuit HC is configured so as to yield desired gears as a result of selectively activating or locking and unlocking the individual frictional elements as shown in the Table in response to an operator's selections. Only essential components of the hydraulic circuit HC relevant to the present invention are shown in FIG. 1.

A first actuator 101 is connected to a pressure line 111 extending from a hydraulic pump 50 and serves to lock the front clutch 16 by the pressure applied through the pressure line 111. A second actuator 102 is connected to a pressure line 112, branching off from the pressure line 111, and serves to unlock the second brake 19 by the pressure applied through the branch pressure line 112. This pressure serves as an unlocking pressure against the locking pressure. A 2-3 shift control valve 103, which is driven by a shift solenoid 105, has two operative positions, i.e., a first operative position in which it opens the pressure line 111, and a second operative position in which it brings the pressure line 111 of the actuator 101 and a pressure discharge or outlet line 113 into communication with each other. In the branch pressure line 112, a 3-2 timing control valve 104 is provided. The control valve 104 is driven by a timing solenoid 106. This 3-2 timing control valve has two operative positions, i.e., a first operative position in which it opens the branch pressure line 112 and a second operative position in which it brings the branch pressure line 112 upstream from the actuator 102 and a pressure discharge or outlet line 114 into communication with each other. In the branch pressure line 112 there is also provided a back flow preventive or check valve 107 and a restriction aperture 108 which are parallel to each other between the 3-2 timing control valve 104 and 2-3 shift control valve 103. This check valve 107 enables the supply of hydraulic pressure from the 2-3 shift control valve 103 toward the second actuator 102 only.

In the configuration of the hydraulic circuit HC, when the 32 timing control valve 104 is closed or located in its first operative position, hydraulic pressure is supplied into the actuator 101 or the actuator 102 depending upon an operated position of the 2-3 shift control valve 103. On the other hand, the hydraulic pressure is discharged or released from the actuators 101 and 102 via the 2-3 shift control valve 103. The discharge of hydraulic pressure from the second actuator 102 via the 2-3 shift control valve 103 is gradually performed over time due to the presence of the restriction aperture 108. When the 3-2 timing control valve 104 is opened or located in its second operative position, the hydraulic pressure is quickly discharged or released from the second actuator 102 through the pressure discharge line 114 via the 3-2 timing control valve 104. Thus, the rate at which the unlocking pressure of the second brake 19 is released is varied by means of the 3-2 timing control valve 104 and restriction aperture 108, so as to change or regulate the speed at which the second brake 19 is locked.

Figure 2:
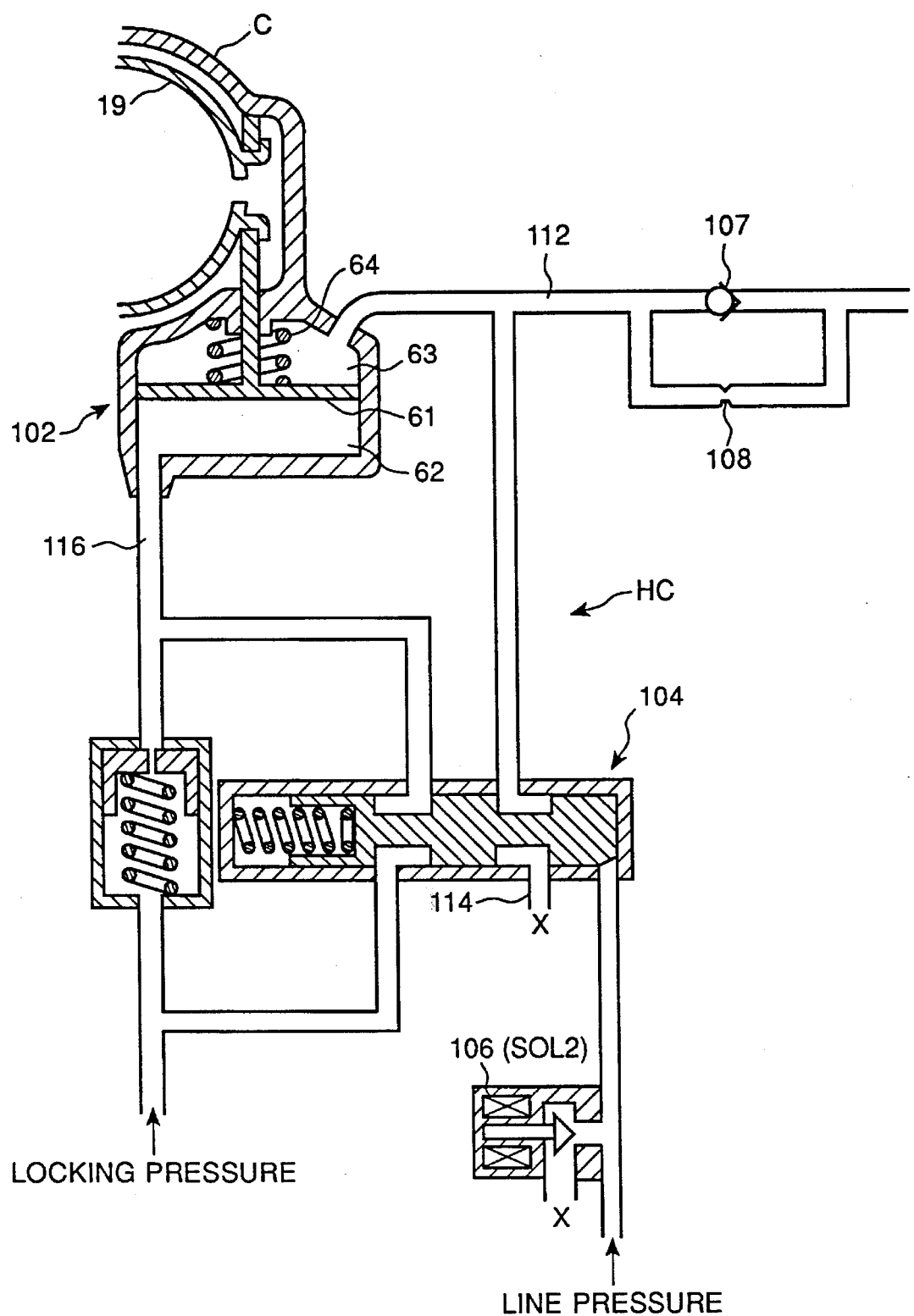
FIG. 2 is an enlarged illustration of a hydraulic circuit for a second actuator.

FIG. 2 illustrates a hydraulic circuit showing an operative relationship among the second brake 19, second actuator 102, 3-2 timing control valve 104, and timing solenoid 106. The actuator 102 is divided into two pressure chambers, i.e., a first pressure chamber 62 for application (which is hereafter referred to as an apply pressure chamber) and a second pressure chamber 63 for release (which is hereafter referred to as a release pressure chamber). The piston 61 is linked to the second brake 19 and urged downward as viewed in FIG. 2 or toward the apply pressure chamber 62 by means of a coil spring 64. A hydraulic pressure is ordinarily applied into the apply pressure chamber 62 via the pressure line 116. On the other hand, when a hydraulic pressure is applied into the release pressure chamber 63, the piston 61 is displaced downward as viewed in FIG. 2, in cooperation with the coil spring 64, so as to unlock the second brake 19. Conversely, when the hydraulic pressure of the release pressure chamber 63 is discharged, the piston 61 is displaced upward as viewed in FIG. 2 or toward the release pressure line 112 so as to lock the second brake 19. The branch pressure line 112, which directly extends from the release pressure chamber 63 as was previously described, is closed so as to be isolated from the pressure discharge line 114 and opened so as to be communicated with the pressure discharge line 114, through switching of the 3-2 timing control valve 104 by means of the timing solenoid 106, during hydraulic pressure application and hydraulic pressure release.

The operation of the hydraulic circuit is managed or controlled by a control circuit 200 comprising a microcomputer which essentially includes a center processing unit (CPU), a read only memory (ROM), a random access memory (RAM), and a clock (CLOCK). This control circuit 200 receives various signals indicative of an engine operating condition, which is detected by a throttle opening sensor 202, and an automatic transmission operating condition, which is detected as an input rotational speed of the transmission gear mechanism 2 by a turbine speed sensor 201. The control circuit 200 executes a gear shift control based on engine operating conditions and automatic transmission operating conditions in accordance with gear shift schedules previously designed and memorized in the form of a map. That is, based on the signals representative of an engine operating condition and an automatic transmission operating condition, the control circuit 200 outputs a gear shift signal A1 to the shift solenoid 105 so as to switch the 2-3 shift control valve 103 to the second position and a timing signal A2 to the timing solenoid 106 so as to switch the 3-2 timing control valve 104 to the second position. The output timings of the signals A1 and A2 will be explained in detail later.

Figure 3:
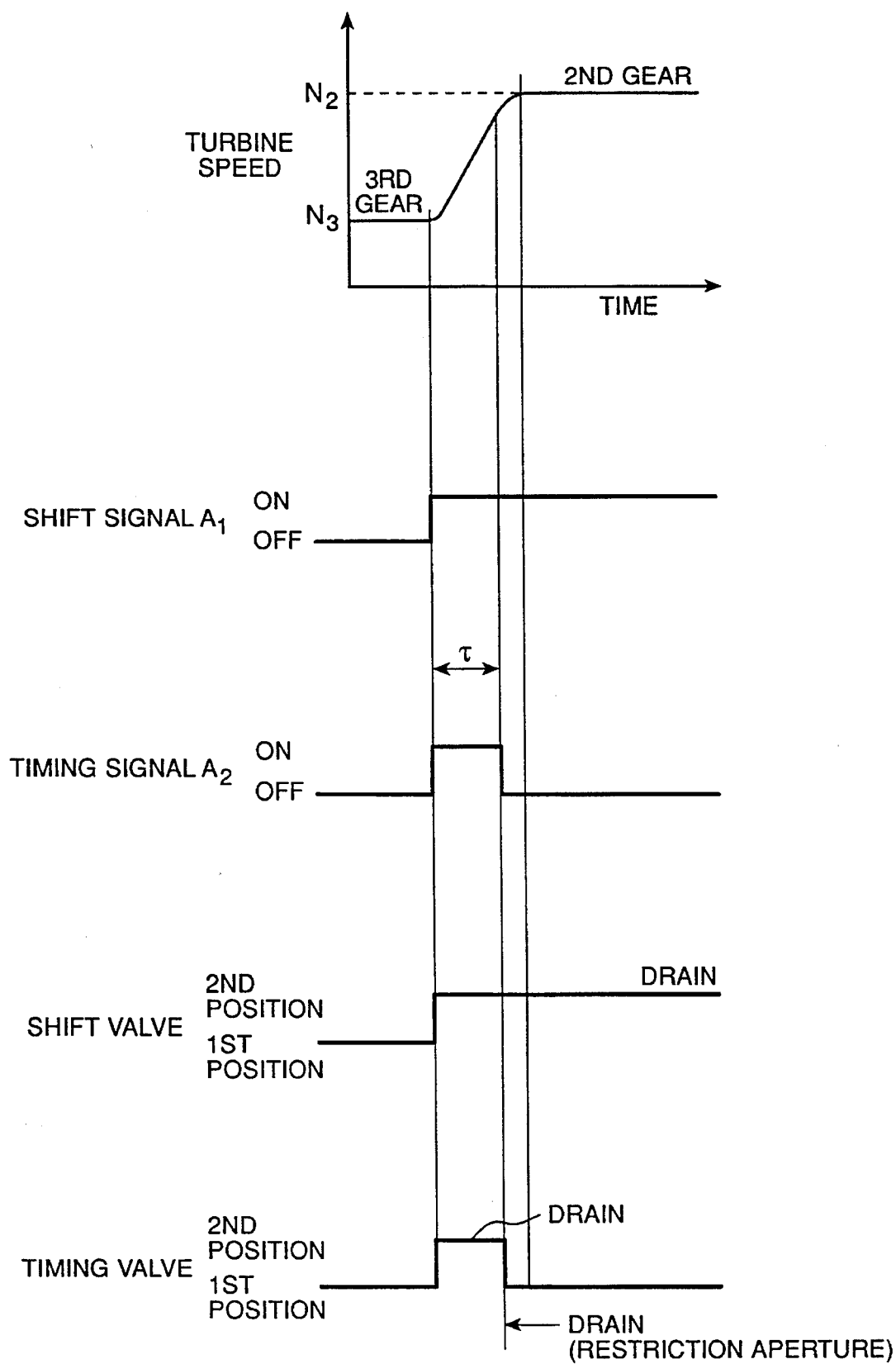
FIG. 3 is a time chart showing timing valve and shift valve operations during a 3-2 shift-down.

Referring to FIG. 3, which shows wave-forms of the gear shift signal A1 and timing signal A2 output from the control circuit 200 to the solenoids 105 and 106, respectively, while the vehicle is running with the automatic transmission AT having been shifted to the third gear which is created in an normal drive condition, neither a gear shift signal A1 nor a timing signal A2 are output. At this time, since the 2-3 shift control valve 103 is placed in its first position, the pressure line 111 is opened so as to supply a hydraulic pressure into the first actuator 101. As a result, the front clutch 16 is locked. On the other hand, since the 3-2 timing control valve 104 is placed in its first position, the pressure line 112 is disconnected from the hydraulic pressure discharge line 114. As a result, the hydraulic pressure is supplied into the second actuator 102, thereby unlocking the second brake 19. When a shift-down to the second gear is invoked from the third gear, the control circuit 200 outputs a gear shift signal A1 as shown in FIG. 3. As a result, the shift solenoid 105 is activated so as to place the 2-3 shift control valve 103 to the second operative position. Accordingly, the hydraulic pressure on the actuator 101 is lowered, so that the front clutch 16 is quickly converted into the unlocked state from the locked state. The output of gear shift signal A1 is accompanied by the output of timing signal A2 from the control circuit 200, and the timing solenoid 106 is activated so as to place the 3-2 timing control valve 104 in the second position. As a result, the hydraulic pressure is quickly released or discharged from the second actuator 102 through the pressure discharge line 114. This timing signal A2 is output only over a specified speed-up time period τ immediately after the output of shift signal A1. When this specified speed-up time period T elapses, the output of timing signal A2 is halted or disappears, so as to shift the 3-2 timing control valve 104 to the first position. Consequently, the hydraulic pressure is gradually released from the second actuator 102 through the pressure discharge line 113 via the restriction aperture 108. Thus, based on the output of timing signal A2 over the specified speed-up time period τ and the disappearance of this signal output after the specified speed-up time period τ, the second brake 19 is quickly displaced in the locking direction over the specified speed-up time period T. Then, the second brake 19 is gradually brought into a locking condition after the specified speed-up time period τ and finally is completely locked.

Figure 5:
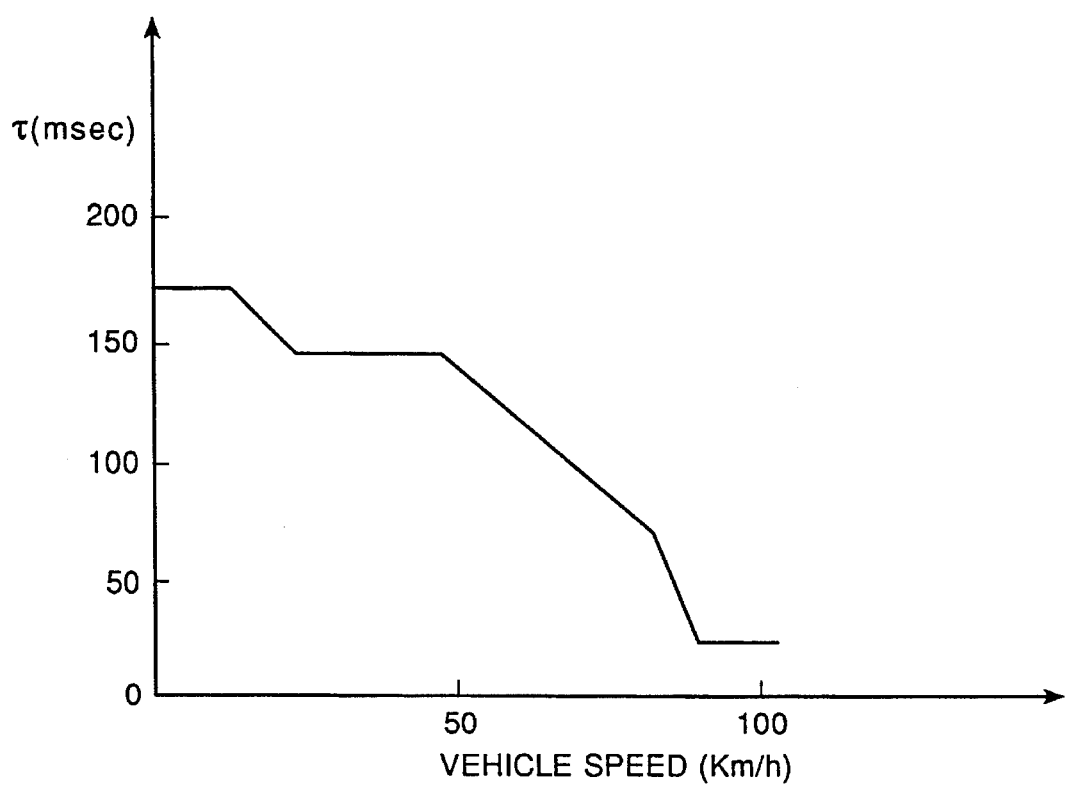
FIG. 5 is a map of basic speed-up time period values.

Referring to FIG. 5, the specified speed-up time period τ in this embodiment is changed by using the vehicle speed as a parameter. However, it may also be changed by using the turbine speed of rotation, throttle opening, the change rate of throttle opening, etc. as a parameter.

The decision of completion of a shift down from the third gear to the second gear (3-2 shift down) is made based on the change of turbine speed of rotation. That is, the turbine speed of rotation TREV changes from a speed of rotation N3 while the vehicle is traveling in the third gear, which is the normal gear, to a speed of rotation N2 while it is traveling in the second gear. The 3-2 shift down is judged to be completed when the rate of change in the turbine speed of rotation VTREV reaches ½ of the maximal rate VTREVM (VTREVM/2).

Figure 6:
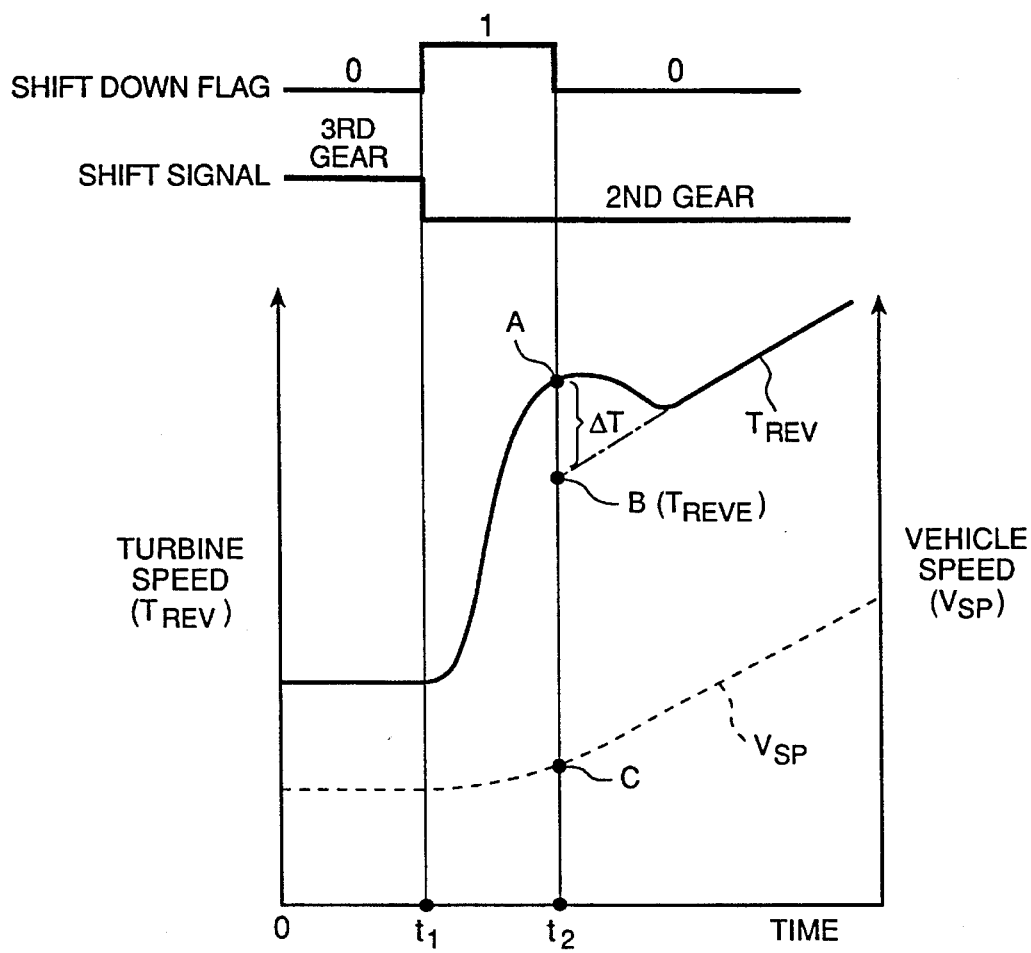
FIG. 6 is a graphical illustration showing a calculation of target turbine speed.

The calibration of the specified speed-up time period τ according to gear shift conditions, such as vehicle speeds, etc., is executed based on an actual turbine speed of rotation TREV at the execution of a decision that a gear shift-down is completed. In more detail, as shown in FIG. 6, at a time t1, gear shift and timing signals A1 and A2 are output, and a shift-down flag Fsd is set to 1. At a time t2, the judgment of gear shift completion is made in the aforementioned procedure and the shift-down flag Fsd is reset to 0. An actual turbine speed of rotation TREV and an actual vehicle speed Vsp at the time t2, at which the judgment of gear shift completion is made, are indicated by points A and C, respectively. Further, a predicted or target turbine speed of rotation TREVE for the second gear, which is predicted based on the actual vehicle speed Vsp at the point C, is indicated by a point B. By obtaining the target turbine speed of rotation TREVE based on an actual vehicle speed Vsp after the judgment of gear shift completion, the target turbine speed of rotation TREVE is calculated accurately without being affected by differences of gear shifts due to, for instance, the speed at which an accelerator pedal is depressed.

Figure 7:
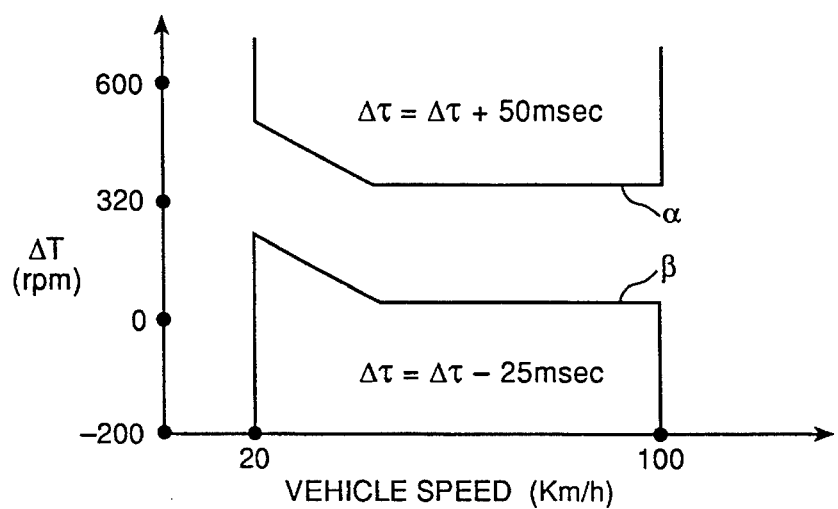
FIG. 7 is a map for obtaining a calibration value for a speed-up time period.
Figure 9:
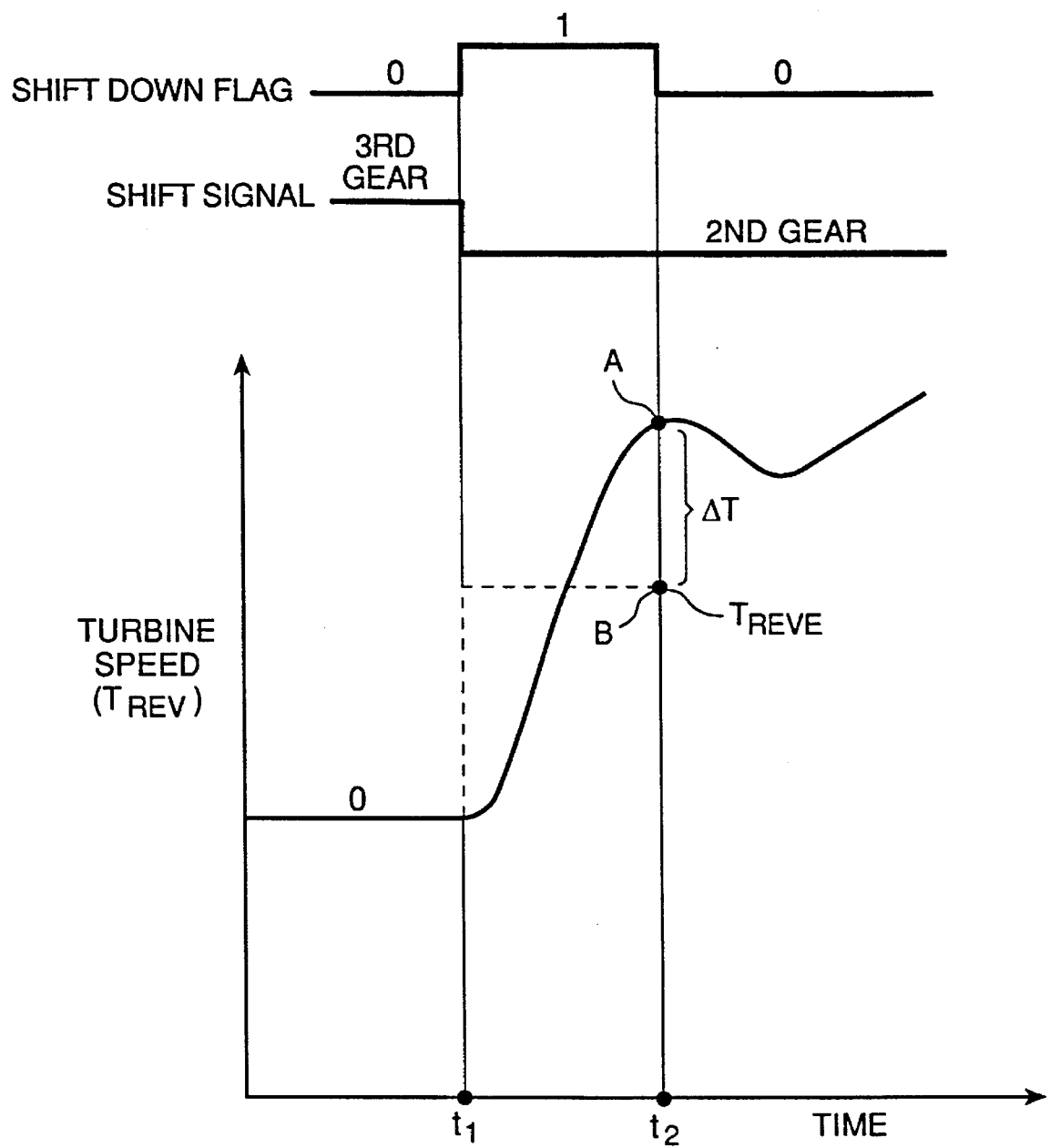
FIG. 9 is a graphical illustration showing a calculation of target turbine speed.

Referring to FIG. 9, illustrating a variation of calculating a predicted or target turbine speed of rotation TREVE at the time it is judged that a gear shift is completed, a target turbine speed of rotation TREVE for the second gear is calculated based on a turbine speed of rotation or an engine speed of rotation at a time t1 a gear shift commences. In this case, an advantage is present because no special vehicle speed sensor is required. A speed difference ΔT, which is obtained by subtracting the target turbine speed of rotation TREVE indicated by a point B from an actual turbine speed of rotation TREV indicated by a point A, is defined as a shooting-up of rotation, based on which the specified speed-up time period τ is calibrated. Otherwise, a speed difference, i.e., a shooting-up of rotation, ΔT may also be calculated based on the difference between an actual engine speed of rotation and a target engine speed of rotation. The calibration value a Δτ of the specified speed-up time period τ, which is determined based on the shooting-up of rotation ΔT, is previously established as shown in FIG. 7. In other words, upper and lower limits α and β of the shooting-up of rotation ΔT are preliminarily defined with respect to vehicle speeds as a parameter. If the shooting-up of rotation ΔT is equal to or higher than the upper limit α, it is considered to be excessively large and, accordingly, the specified speed-up time period τ is calibrated so as to become longer. On the other hand, if the shooting-up of rotation ΔT is equal to or lower than the lower limit β, the shooting-up of rotation ΔT is estimated to be excessively small, i.e., a slump of turbine speed of rotation has been caused. Then, the specified speed-up time period τ is calibrated so as to become shorter. When the calibration is carried out at a level equal to or lower than the lower limit β, the unit calibration decrement per gear shift is set to a time of "25 msec." for minimizing the influences of noise and preventing hunching. On the other hand, when the calibration is carried out at a level equal to or higher than the upper limit α, the unit calibration increment per gear shift is set to a time of "50 msec." for dissolving a shooting-up of rotation within a short period of time.

Figure 4:
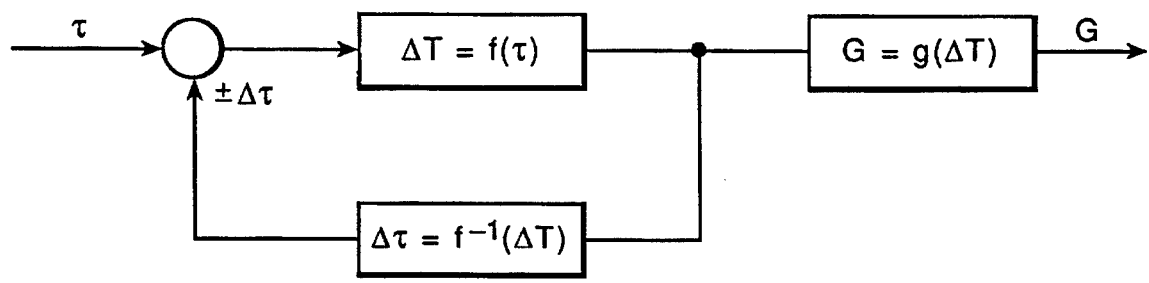
FIG. 4 is a diagram showing a feedback control of calibration of a speed-up time period.
Figure 8:
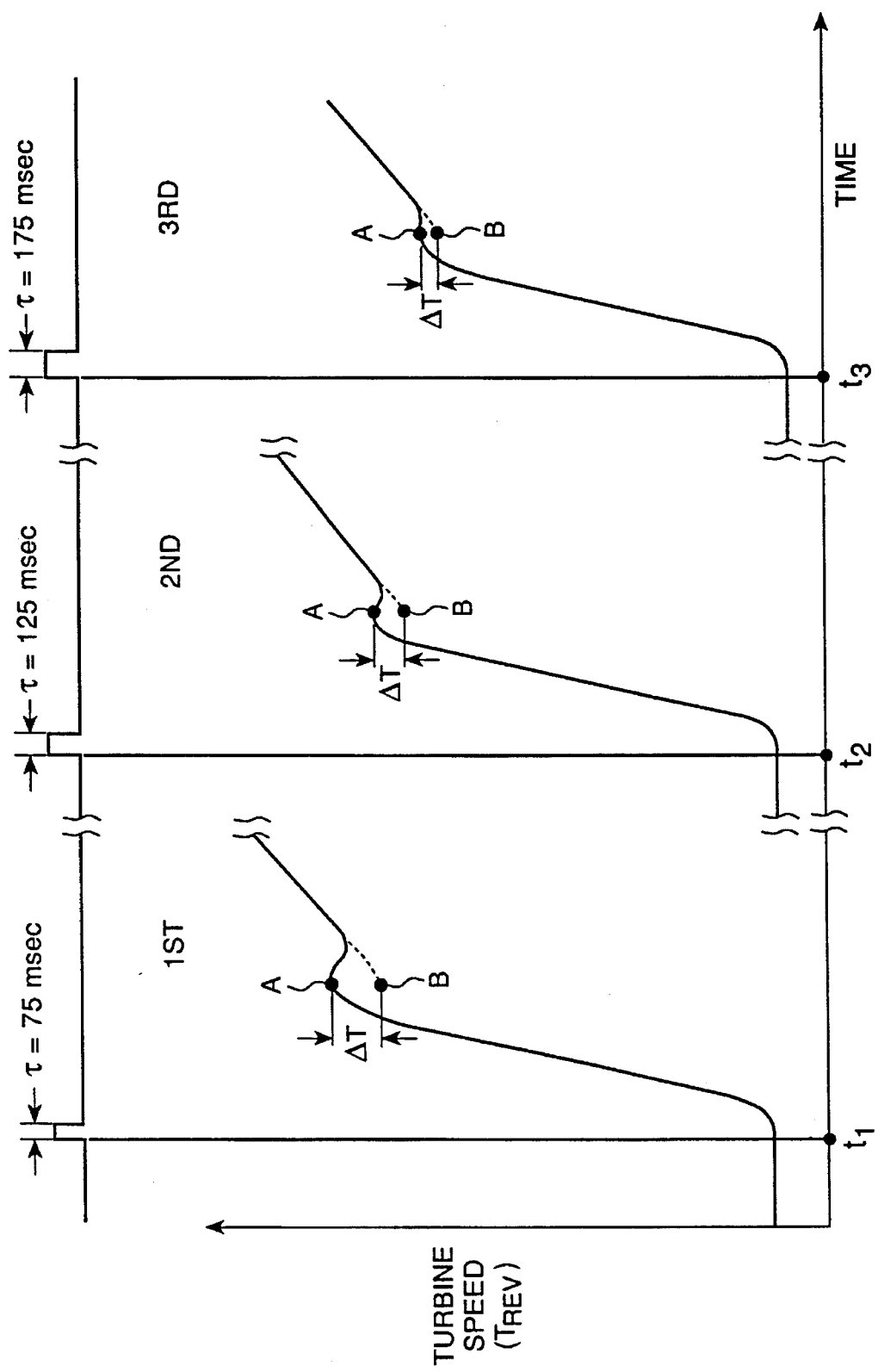
FIG. 8 is a graphical illustration showing a decrease in shift shock.

FIG. 8 diagrammatically illustrates a calibration based on a shooting-up of rotation ΔT under a specific gear shift condition (for instance a vehicle speed) in which the specified speed-up time period τ is calibrated so as to become longer due to an excessive shooting-up of rotation. Specifically, a specified speed-up time period τ of, for instance, "75 msec." is set for a first 3-2 shift-down. At this time, since a shooting-up of rotation ΔT is relatively high (ΔT≧α), the specified speed-up time period τ is changed or prolonged to "125 msec." for a second 3-2 shift-down by adding "50 msec.," which is the unit calibration increment time per gear shift, to the specified speed-up time period τ for the first gear shift. As a result of this second 3-2 shift-down, the shooting-up of rotation AT becomes lower than that in the first 3-2 shift-down. However, this shooting-up of rotation is still high (∴T≧α). Accordingly, for the third 3-2 shift-down, the specified speed-up time period τ is changed or increased to "175 msec.," which is obtained by adding the unit calibration increment time of "50 msec." to the second specified speed-up time period τ of 125 msec. As a result, the rapid shooting-up of rotation ΔT is further reduced during the third 3-2 shift-down. When the specified speed-up time period τ is thus calibrated in accordance with a shooting-up of rotation ∴T, an optimal specified speed-up time period τ for minimizing a shift shock is established. On the other hand, when a shooting-up of rotation ΔT is excessively low (ΔT≦β), a unit calibration decrement time of "25 msec." is subtracted from the specified speed-up time period τ per gear shift. Such a feedback control, based on a shooting-up of rotation ΔT, is shown in FIG. 4. In this instance, in FIG. 4, a degree of acceleration exerted on a vehicle in forward or backward directions as shift shocks is indicated by a character G.

The operation of the gear shift control system depicted in FIG. 1 is best understood by reviewing FIGS. 10 to 13 which are flow charts illustrating main routine and subroutines a gear shift control.

Figure 10:
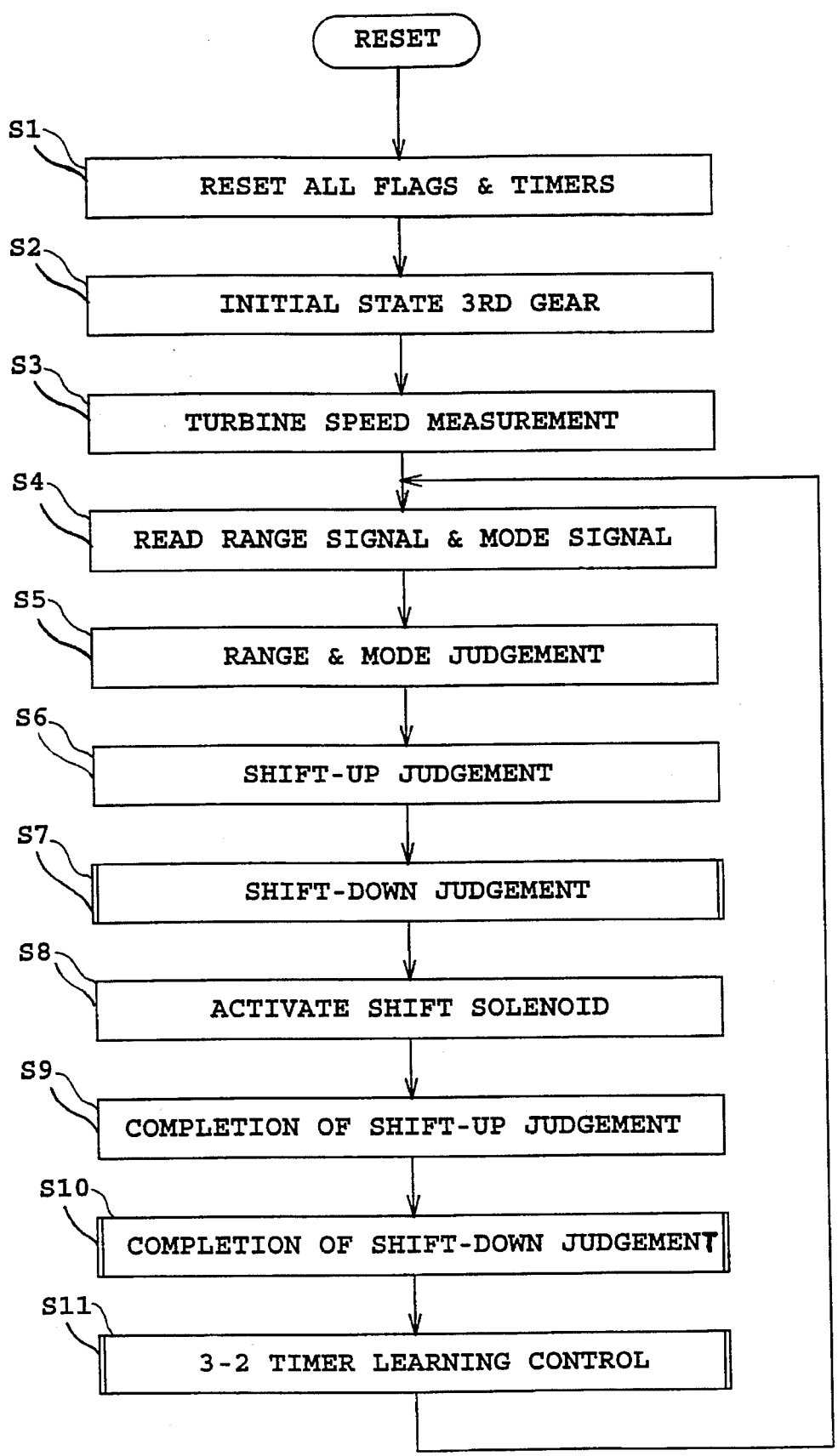
FIG. 10 is a flow chart illustrating a shift control main routine.

Referring to FIG. 10, which is a flow chart of the main gear shift control sequential routine, the sequence commences or is reset and control passes directly to function blocks in which initial settings are made at steps S1 through S3. Specifically, all flags and timers are reset at step S1. The gear position of the transmission gear mechanism 2 is set to the third gear at step S2, and the turbine speed of rotation is measured for 125 msec. at step S3.

Subsequently, the control proceeds to steps S4 through S12 which are repeatedly executed every 25 msec. Specifically, after reading mode and range signals representative of a selected mode, i.e., an economy mode or a power mode, and a selected range, i.e., a park (P) range, a reverse (R) range, a neutral (N) range, a drive (D) range, a second (2nd) range or a first (1st) range, from a mode selection switch 203 and a range selection switch 204, respectively, at S4, the selected range and mode are judged based on the range signal and mode signal at S5. These mode and range selections are detected by means of a mode selection switch and a range selection switch which are not shown but are well known to those in the art. Thereafter, a shift-up judgment and a shift-down judgment are made at steps S6 and S7, respectively. The shift-down judgment will be described in detail later in conjunction with FIG. 11. At step S8, signals are provided so as to activate necessary solenoids. Then, a shift-up completion judgment and a shift-down completion judgment are subsequently made at steps S9 and S10, respectively. The shift-down completion judgment will be described in detail later in conjunction with FIG. 12. Finally, at S11, a learning control is executed in order to establish the specified speed-up time period τ, according to which a timing at which the 3-2 timing control valve 104 is driven is determined. These steps S4 through S11 are repeated every 25 msec.

Figure 11:
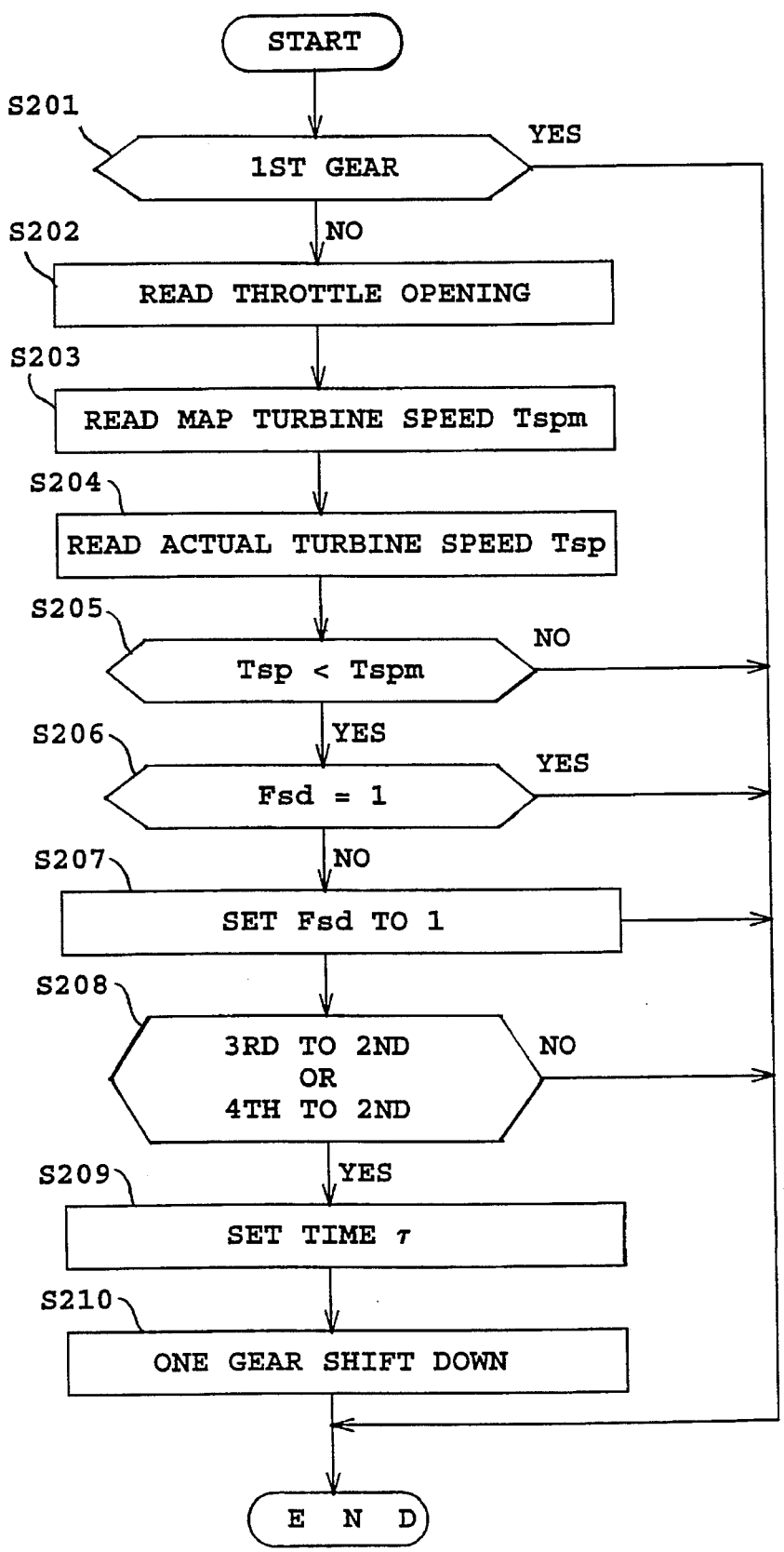
FIG. 11 is a flow chart illustrating a shift-down judgment subroutine.
Figure 15:
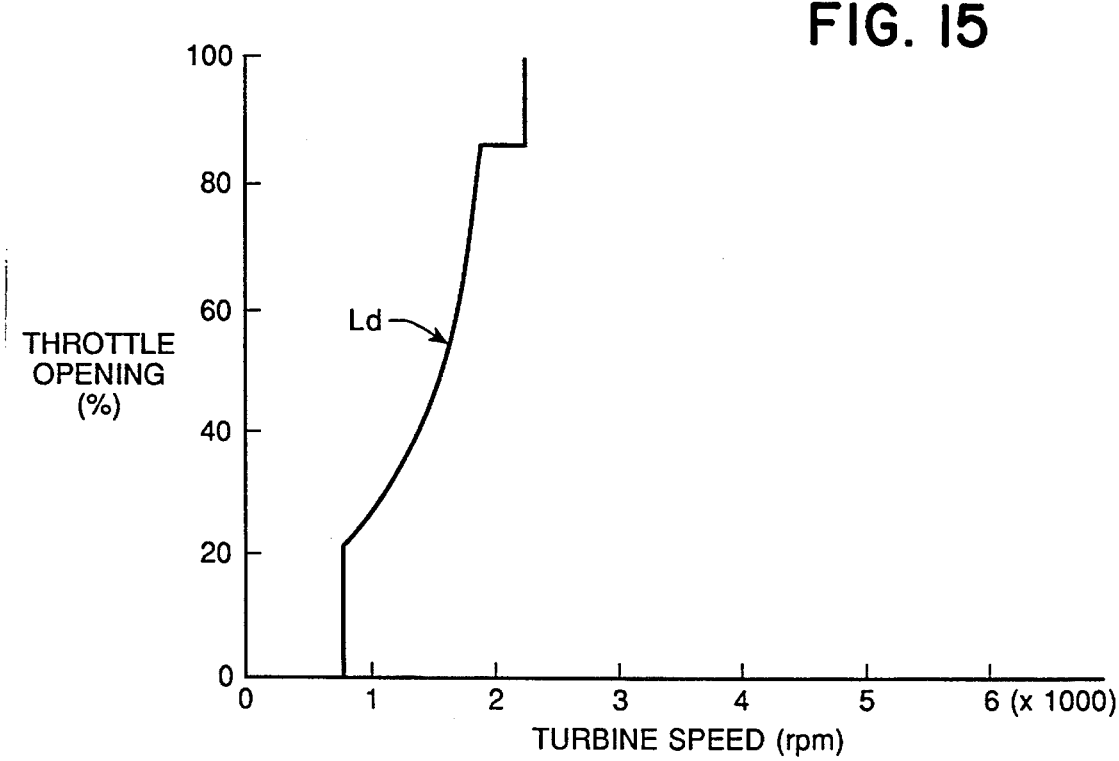
FIG. 15 is a diagram showing a shift-down schedule.
Figure 16:
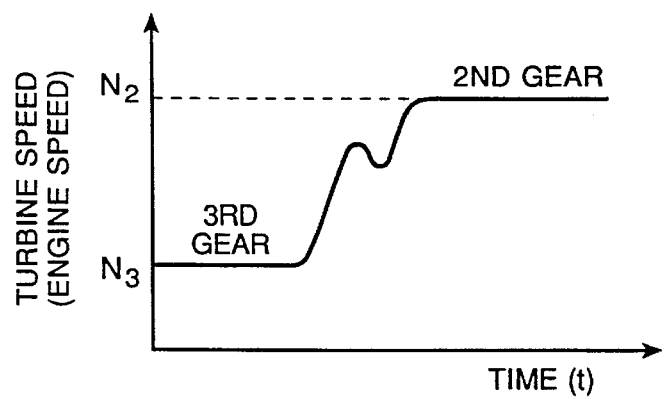
FIG. 16 is a graphical illustration showing a slump of turbine rotation.
Figure 17:
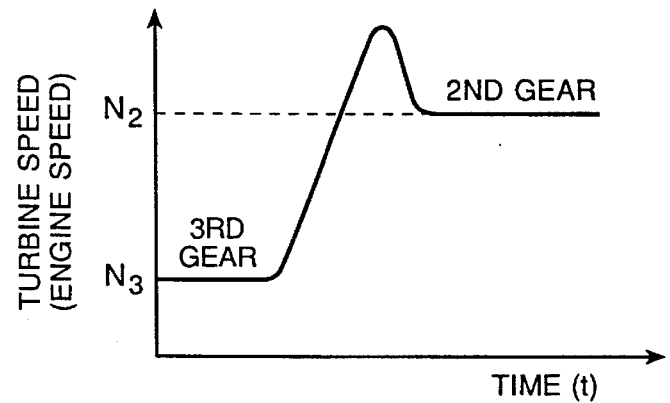
FIG. 17 is a graphical illustration showing a shooting-up of turbine rotation.

Referring to FIG. 11, which is a flow chart of the shift-down judgment subroutine, the first step S201 is to decode a selected gear signal and make a decision as to whether the selected gear is the first gear. If the answer to this decision is "YES," then, the shift-down judgment subroutine passes directly to its end. On the other hand, if the answer to the decision made at step S201 is "NO," this indicates that the automatic transmission AT has been shifted to gears other than the first gear, namely, any one of the second, third and fourth gears. Then, after reading the throttle opening represented by a signal from the engine load sensor 202 at S202, a turbine speed of rotation corresponding to the throttle opening is read on a gear shift schedule line Ld of a shift-down map shown in FIG. 15 at S203 (this turbine speed of rotation is hereafter referred to simply as a map turbine speed Tspm). Subsequently, an actual turbine speed of rotation (which is hereafter referred to simply as an actual turbine speed Tsp) is decoded based on a signal from the turbine speed sensor 201 at S204 and judged as to whether or not it is lower than the map turbine speed Tspm. If the answer to this judgment is "YES," it is subsequently judged at step S206 whether or not the shift-down flag Fsd has been set to "1." This shift-down flag Fsd is set to "1" when a shift-down is executed, and the resulting shift down state is memorized. If the answer to the decision concerning the shift-down flag Fsd is "YES," this indicates that a shift-down is being executed. Then, the shift-down judgment subroutine passes directly to its end.

On the other hand, if the answer to the decision on the shift-down flag Fsd made at step S206 is "NO," then, after setting the shift-down flag Fsd to "1" at step S207, a decision is made at step S208 as to whether or not the gear shift, which should take place, is any one of the 3-2 and continuous 4-3-2 shift-downs. If the answer to this decision "NO," the shift-down judgment subroutine passes directly to its end. However, if the answer is "YES," then, at step S209, the specified speed-up time period τ is set to the sum of a time τ(vsp) determined based on a current vehicle speed Vsp with reference to a map shown in FIG. 5 and a calibration time τ(vsp) memorized in relation to this gear shift condition (i.e., the vehicle speed). Thereafter, signals A1 and A2 are provided so as to shift the transmission gear mechanism 2 one position down, namely, to the second gear or the third gear at step S210 and the shift-down judgment subroutine terminates.

Figure 12:
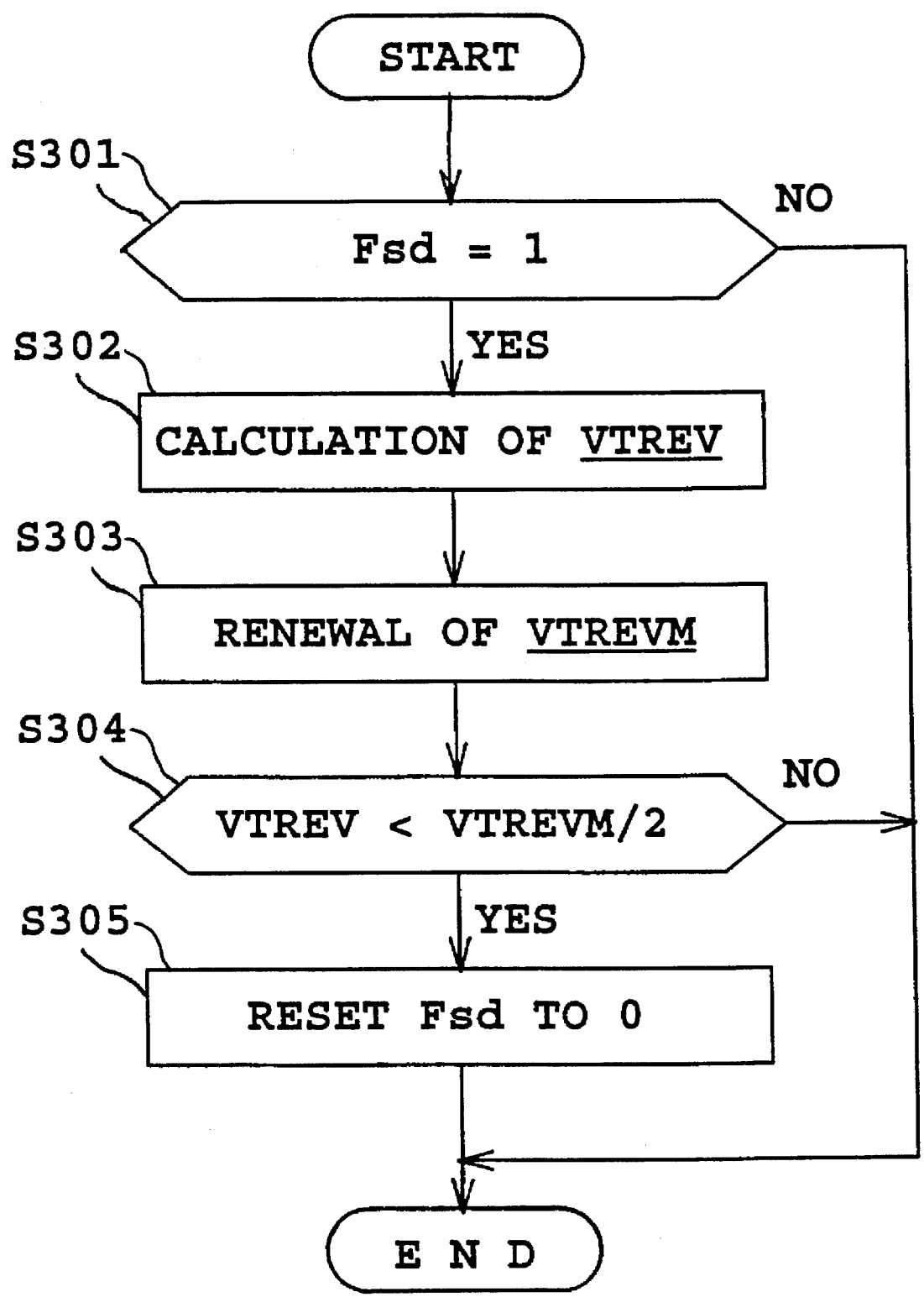
FIG. 12 is a flow chart illustrating a subroutine for judgement of completion of a shift-down.

FIG. 12 is a flow chart of the shift-down completion judgment subroutine. This sequence commences and passes directly to step S301, at which a decision is made as to whether or not the shift-down flag Fsd has been set to "1."

If the answer to this decision is "NO," then, the sequence is directly terminated. However, if the answer to the decision is "YES," the rate of turbine speed change (which is hereafter referred to as a turbine speed change rate) VTREV is calculated based on the signal from the turbine speed sensor 201 at S302. Subsequently, after renewing the maximal rate of turbine speed change during the gear shift down (which is hereafter referred to as a maximal turbine speed change rate) VTREVM at step S303, a decision is made at step S304 as to whether or not the turbine speed change rate VTREV is lower than half the maximal turbine speed change rate VTREVM. If the answer to the decision is "NO," the sequence is terminated. However, if the turbine causes a shooting-up of rotation, the turbine speed change rate VTREV becomes smaller than half the maximal turbine speed change rate VTREVM at a peak of the shooting-up of rotation. In this event, the answer to the decision made at step S304 is "YES," and, after resetting the shift-down flag Fsd to "0" at step S305, the sequence is terminated.

Figure 13:
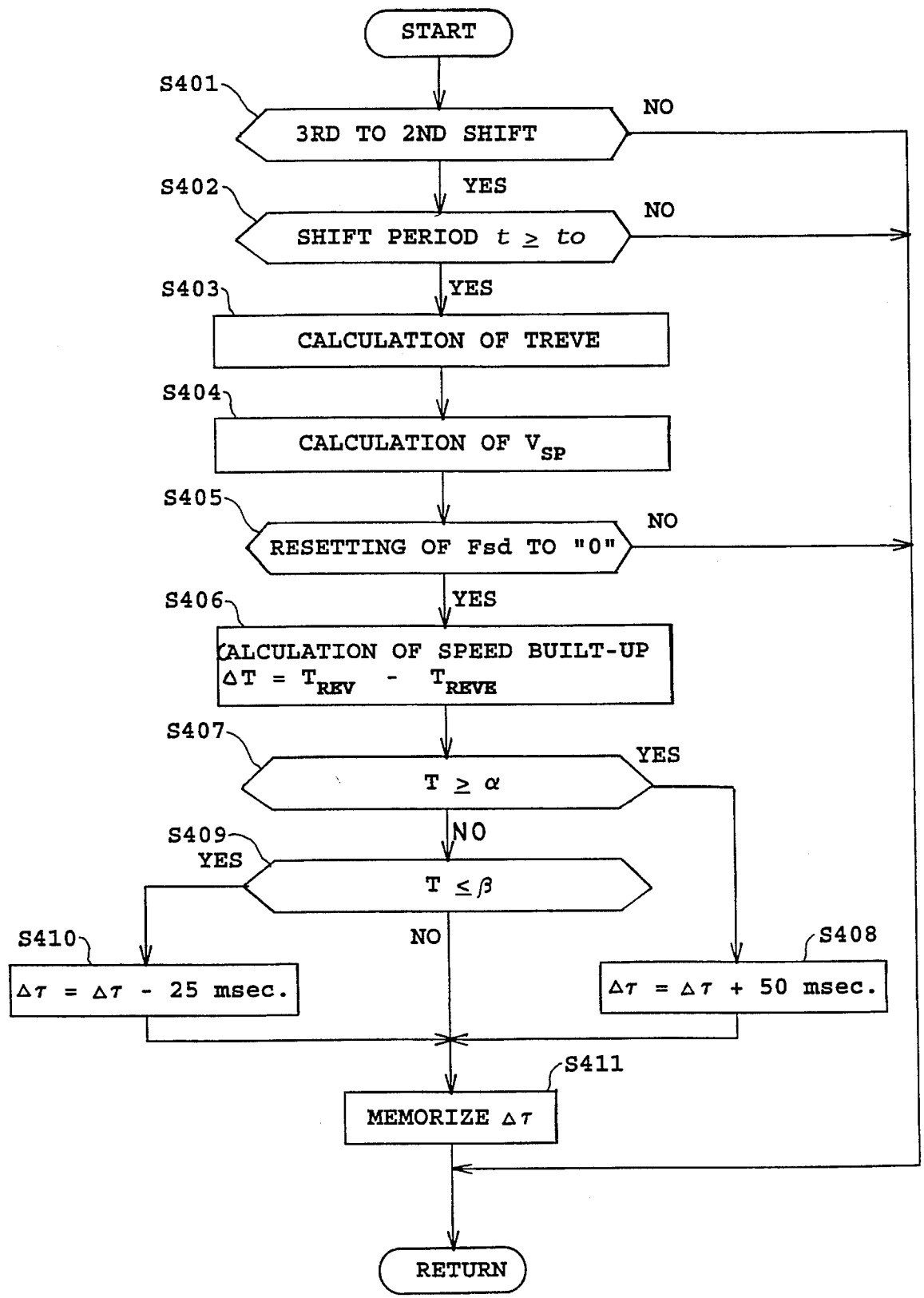
FIG. 13 is a flow chart illustrating a 3-2 timer learning control subroutine.
Figure 19:
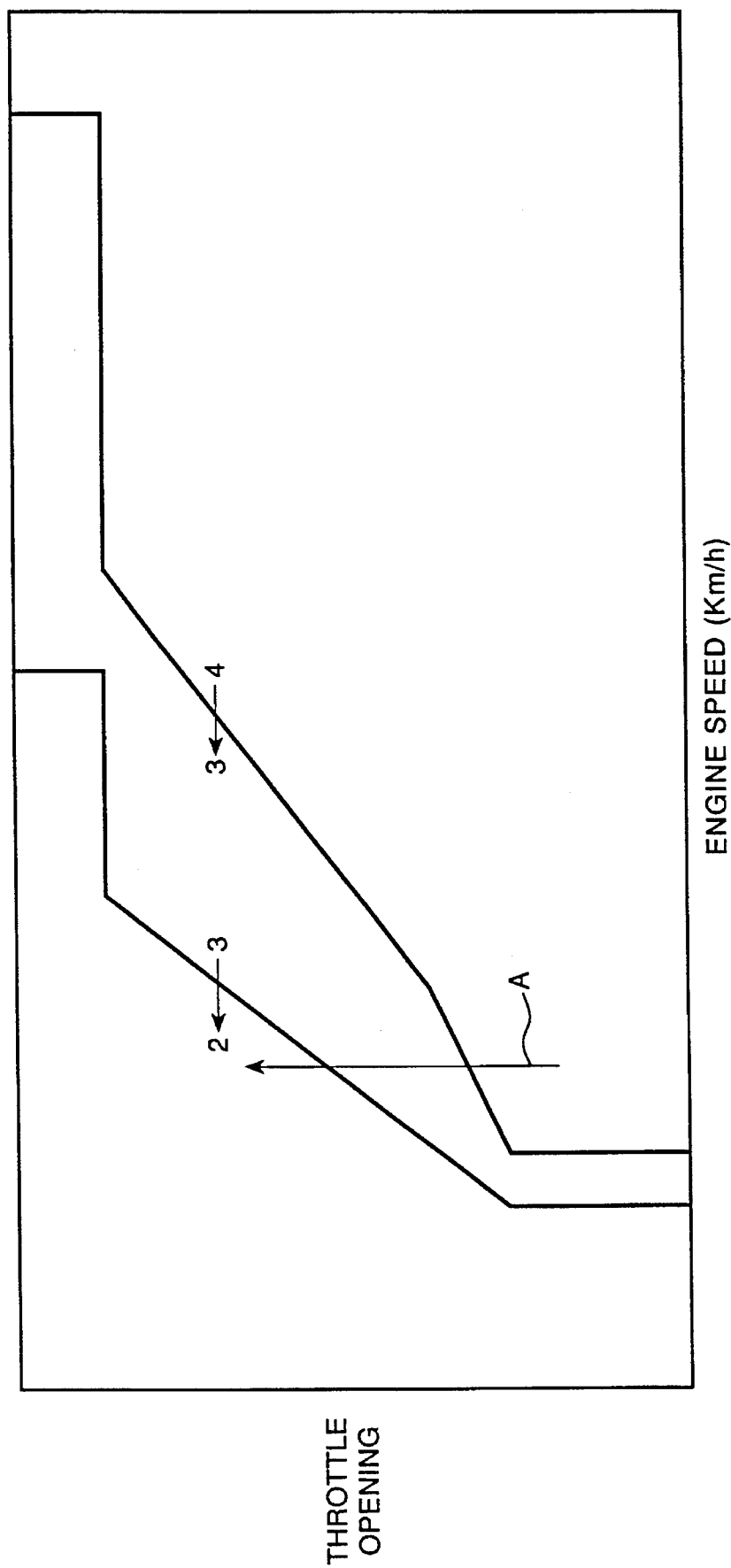
FIG. 19 is a diagram showing shift-down schedules for a continuous 4-3-2 shift-down.

FIG. 13 is the learning control subroutine for establishing the drive timing of the 3-2 timing control valve 104. This sequence commences and control passes directly to a decision at step S401 as to whether the shift-down is from the third gear to the second gear. If the answer to the decision is "YES," another decision is made at step S402 as to whether a transitional period t between the completion of the 4-3 shift-down and the commencement of the 3-2 shift-down after the 4-3 shift-down is greater than a specified time period to of, for instance, one (1) second. As shown by an arrow A in FIG. 19, a continuous 4-3-2 shift-down takes place following an increase in throttle opening. A 4-3 shift-down is achieved at, and recognized by, the termination of supplying of a locking pressure supply into the direct clutch 29 and supplying an unlocking pressure into the release pressure chamber 63 of the actuator 102 for the second brake 19. Thereafter, a 3-2 shift-down takes place. If the answer to the decision made at step S402 is "YES," that is, the transitional period t is greater than the specified time period to, this indicates that an ordinary 3-2 shift-down has taken place. Then, the learning control of the specified speed-up time period (drive timing) τ for the 3-2 timing control valve 104 is executed at steps S403 through S412. However, if the answer to the decision made at step S402 is "NO," that is, the transitional period t is equal to or less than the specified time period to, a continuous 4-3-2 shift-down has been invoked quickly from the fourth gear to second gear via the third gear. Then, the sequence returns without executing the drive timing learning control.

Subsequently, a target turbine speed of rotation TREVE is calculated based on the turbine speed of rotation at the beginning of the shift-down at step S403. After detecting a vehicle speed Vsp at step S404, a decision is made at step S405 as to whether or not the resulting state is immediately after the reset of the shift-down flag Fsd to "0" from "1." If the answer to this decision is "NO," the sequence returns. On the other hand, if the answer to the decision made at Step S405 is "YES," the shooting-up of rotation ΔT is calculated by subtracting the target turbine speed of rotation TREVE from the actual turbine speed of rotation TREV at step S406. Subsequently, a decision is made at step S407 as to whether or not the shooting-up of rotation τ is equal to or greater than the upper limit α. If the answer to this judgment is "YES," this indicates that the turbine speed is rather rapidly shooting up. Then, a new calibration time Δτ is established by changing the previous calibration time ΔT by the unit increment time of "50 msec." at step S408. This new calibration time Δτ is memorized as a vehicle speed-depending calibration time Δτ (vsp) at step S411. This vehicle speed-depending calibration time Δτ (vsp) is added to a specified speed-up time period τ read out from the map at another shift-down under an identical gear shift condition.

On the other hand, if the answer to the decision concerning the upper limit α made at step S407 is "NO," another decision is made at step S409 as to whether or not the shooting-up of rotation ΔT is equal to or less than the lower limit β. If the answer is "YES," a new calibration time ΔT is established by changing the previous calibration time Δτ by the unit calibration decrement time of "25 msec." at step S410. Thereafter, this new calibration time Δτ is memorized at step S411. If the answer to the decision made at step S409 is "NO," then, since there is no need to calibrate the calibration time Δτ, the sequence returns after memorizing the calibration time Δτ without renewing it at step S411.

Accordingly, by means of steps S208 and S209 of the shift-down judgment sequence, during a 3-2 shift-down by switching the torque transmission path of the transmission gear mechanism 2, the 3-2 timing control valve 104 for the second brake (2nd BR) 19 is opened, as a locking speed control means, so as to speed up locking of the second brake 19 during the 3-2 shift-down for the specified speed-up time period τ, thereby quickly discharging or releasing the unlocking pressure of the second brake 19 without letting the unlocking pressure pass through the restriction aperture 108 for the specified speed-up time period τ.

Further, by means of the 3-2 timer learning control sequence, the specified speed-up time period τ for the locking speed is respondingly calibrated through steps S208 and S209 with the use of the calibration time Δτ prior to a subsequent a third-to-second shift-down in accordance with the deviation ΔT of a turbine speed of rotation TREV from a target turbine speed of rotation TREVE. This calibration is made upon a judgment that the current gear shift is terminated in response to a signal from the turbine speed sensor 201.

By means of step S402 of the 3-2 timer learning control subsequence, a shift period measurement means is configured, which measures a transitional period t for a continuous 4-3-2 shift-down. This transitional period t is the transitional time from between the completion of a 4-3 shift-down prior to a 3-2 shift-down, for which a calibration of the specified speed-up time period τ is conducted, to the commencement of the 3-2 shift-down. Moreover, the learning control of the specified speed-up time period τ responsive to the transitional period t is prohibited by means of step S402 when the transitional period t is equal to or less than the specified time period to.

As described above, therefore, the learning calibration value or time ∴τ for the specified speed-up time period τ for which locking of the second brake 19 during a 3-2 shift-down is speeded up is set at a higher value, i.e., the unit increment time of 50 msec. on a shooting-up of rotation when the difference of an actual turbine speed of rotation TREV at the judgment of the completion of the 3-2 shift-down from the target turbine speed of rotation TREVE is equal to or greater than the upper limit α. Since setting of the unit increment time of 50 msec. is conducted upon each occurrence of a shooting-up of rotation, the locking speed at which the second brake 19 is locked is optimized after relatively few occurrences of shooting-up of rotation. This eliminates the shooting-up of rotation in a short period of time. On the other hand, if a slump of turbine speed is caused in which the difference of the turbine speed of rotation TREV at the judgment of completion of a 3-2 shift-down from the target turbine speed of rotation TREVE is equal to or less than the lower limit β, setting of the learning calibration value or time Δτ for the specified speed-up time period τ at a low level of a unit increment time of 25 msec. is conducted upon each occurrence of a slump of turbine speed. The learning calibration of the specified speed-up time period τ, therefore, is performed properly and consistently. As a result, the speed of locking of the second brake 19 is gradually lowered, with an increase in the number of occurrences of slumps of turbine speed, so that the turbine speed of rotation TREV at the judgment of termination of the 3-2 shift-down is accurately controlled and regulated to approach the target turbine speed of rotation TREVE, thereby effectively alleviating or eliminating a shift shock in the transmission gear mechanism 2.

In this instance, the continuous 4-3-2 shift-down may be invoked within a short transitional period t less than the specified time period to. Both locking pressure and unlocking pressure are simultaneously supplied into the direct clutch 29 and the release pressure chamber 63 of the actuator 102 for the second brake 19, respectively, so as to create the third gear. Consequently, a large quantity of a working oil is consumed during this process and the hydraulic circuit experiences a slump of line pressure. Under this condition, a locking pressure (a line pressure) is supplied into the apply pressure chamber 62 of the actuator 102 for the second brake 19 so as to create the second gear. During the continuous 4-3-2 shift-down, the line pressure is lower than that during a normal 3-2 shift-down. Execution of a learning calibration of the specified speed-up time period τ, for which releasing of the pressure of the second brake 19, i.e., locking of the second brake 19, is speeded up by opening the 3-2 timing control valve 104, may be performed in such a continuous 4-3-2 shift-down. A proper calibration of the specified speed period τ, therefore, is hindered in the normal 3-2 shift-down.

However, with the shift control system of the present invention, the learning calibration of the specified speed-up time period τ is prohibited in a continuous shift-down such as a shift-down from the fourth gear to the second gear via the third gear. Consequently, the learning calibration of the specified speed-up time period τ during a normal 3-2 shift-down is performed properly. In this normal 3-2 shift-down, therefore, the turbine speed of rotation TREV is unaccompanied by a shooting-up of rotation or a slump of rotation with respect to a target turbine speed TREVE and, therefore, gear shift shocks are effectively alleviated or eliminated.

The learning control conducted at step S11 of the main sequence of gear shift control may be modified so as to calculate a shooting-up of rotation Δτ based on a basic shooting-up of rotation ΔTB.

Figure 14:
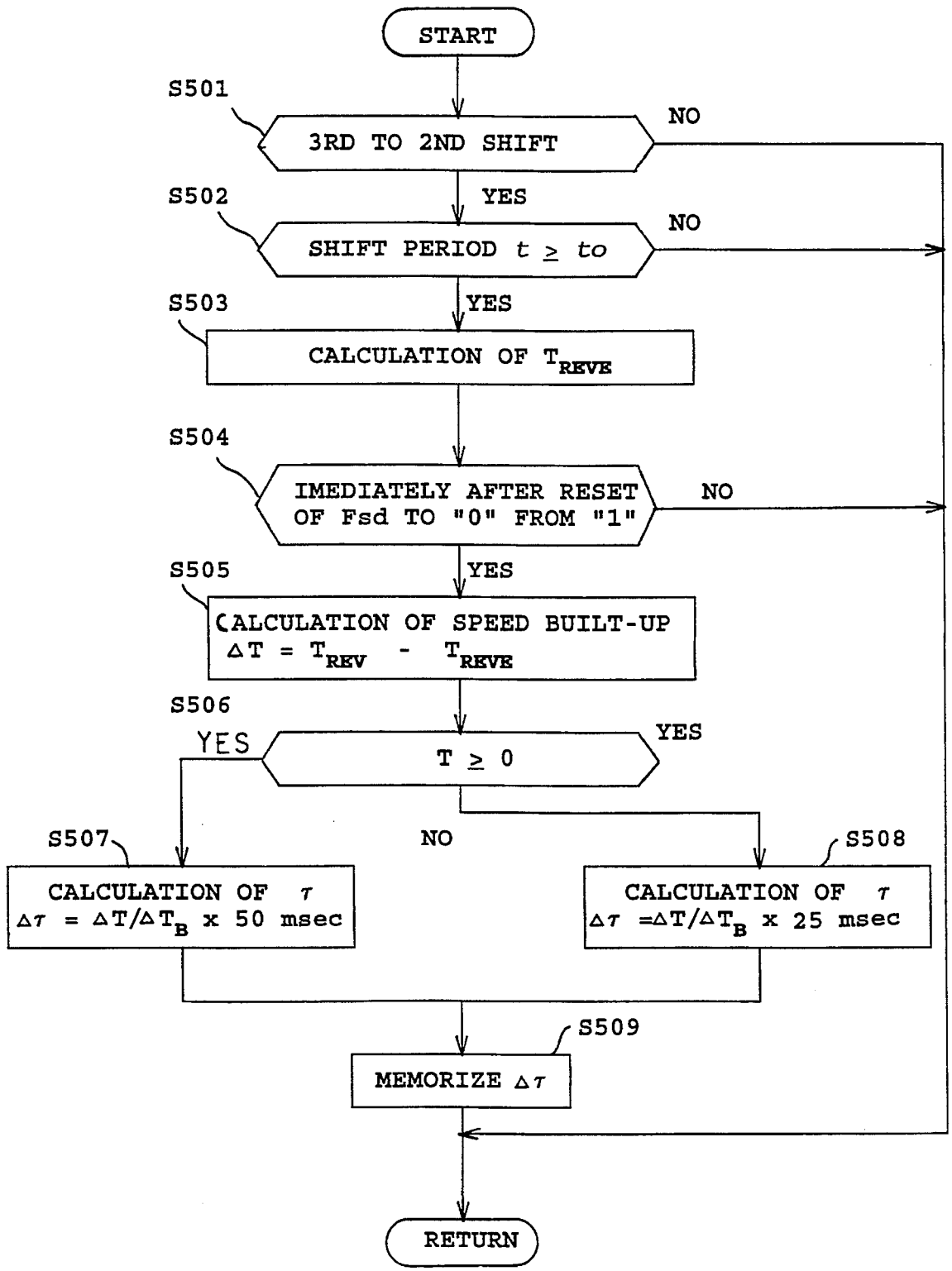
FIG. 14 is a flow chart illustrating a variation of the 3timer learning control subroutine.

FIG. 14 shows a flow chart of the learning control subroutine for establishing the drive timing of the 3-2 timing control valve 104. Steps S501 through S505 correspond to the steps S401 through S403, S405 and S406 of the learning control subroutine shown in FIG. 13. However, since a vehicle speed Vsp is not used for calculating a calibration value or time ΔT, no function corresponding to step S404 of the learning control subroutine shown in FIG. 13 is included. After the calculation of shooting-up of rotation Δτ at step S505, a decision is made at step S506 as to whether or not the shooting-up of rotation ΔT is a positive or plus value. If the answer is "YES," i.e., the shooting-up of rotation ΔT is a positive or plus value, then, a calibration value or time Δτ is calculated by dividing the shooting-up of rotation ΔT× the unit increment time of "50 msec." by the standard value ΔTB at S507. On the other hand, when the answer to the decision is "NO," i.e., the shooting-up of rotation τ is a negative or minus value, the turbine speed is slumping and the calibration time τ is calculated by dividing the slump of rotation τx the unit decrement time "25 msec." by the basic shooting-up of rotation ΔTB at step S508. The calibration time Δτ obtained at any one of steps S507 and S508 is memorized at step S509. With the learning control shown in FIG. 14, the specified speed-up time period τ commensurate with the shooting-up or slump of rotation a τT is established all at once by means of a single calibration. Also in this modified learning control, an immediate return is executed in the case where a continuous shift down from the fourth gear to the second gear via the third gear is invoked over a period of time equal to or less than the specified period of time to at step S502 so as to prohibit a further progress of the learning calibration of specified speed-up time period τ for speeding up locking of the second brake 19. Consequently, any shooting-up or slump of turbine speed of rotation TREV during a normal 3-2 shift-down is suppressed or prevented, which effectively alleviates or eliminates shift shocks.

Figure 18:
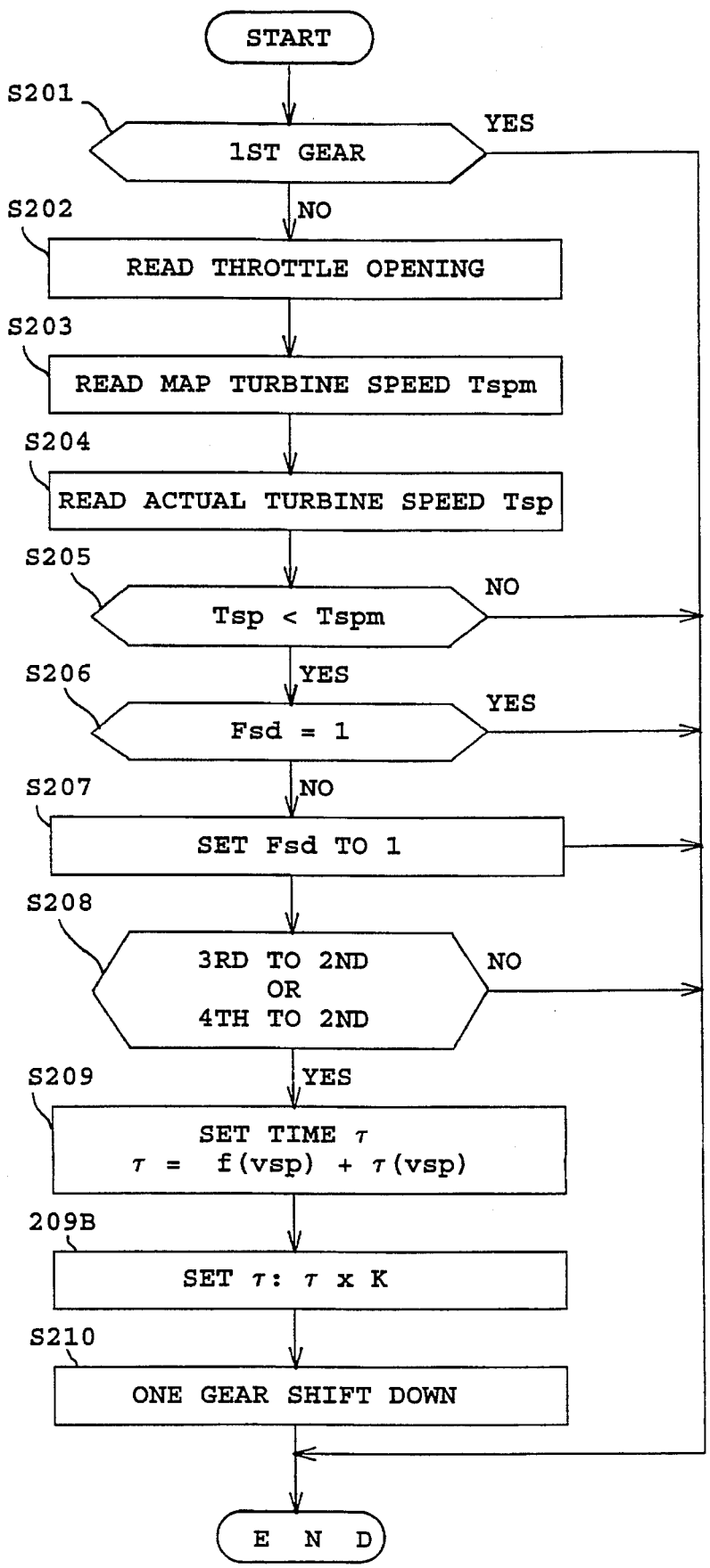
FIG. 18 is another flow chart illustrating a shift-down judgment subroutine.

FIG. 18 shows a flow chart of another shift-down completion judgment subsequence in which, unlike the aforementioned embodiment in which the calibration of the specified speed-up time period τ for speeding up locking of the second brake 19 is prohibited during a continuous, quick 4-3-2 shift-down from the fourth gear to the second gear via the third gear, a calibration time Δτ of the specified speed-up time period τ is replaced by a calibration coefficient K. Specifically, a timer for counting down the specified period of time to is started at step S209B between steps S209 and S210 upon the completion of a 4-3 shift-down and the 4-3 shift-down flag 4/3-Fsd is reset from "1" to "0." When a 3-2 shift-down commences within this specified period of time to and the 3-2 shift-down flag 3/2-Fsd is set from "0" to "1," a calibration coefficient K, commensurate with the timer count, is established. Specifically, a large calibration coefficient K is established when the timer count is still high and, with a decrease in the timer count, the calibration coefficient K is gradually lowered. When the timer count reaches zero, the calibration coefficient K is set to "1." In this instance, the calibration coefficient K is equal to or larger than 1 (K≧1). The specified speed-up time period τ set at S209 is calibrated by using the calibration coefficient K thus established (i.e., τ=τ×K) so as to be elevated from its original value.

In the shift down judgment subroutine, the function at step S209B constitutes a time period setting means, which measures a time between the reset of the 4-3 shift-down flag 4/3-Fsd to "0." Resetting of the 4-3 shift-down flag is caused when the 4-3 shift-down is completed prior to the 3-2 shift-down which has to be subjected to the calibration of the specified speed-up time period τ. The execution of the 3-2 shift-down is based on the timer count counted down from the initial count equivalent to specified period of time to. The calibration value or time Δτ (vsp) of the specified speed-up time period τ is changed to a calibration coefficient K when the time measured by the period setting means is short, i.e., the time count is still high.

Figure 20:
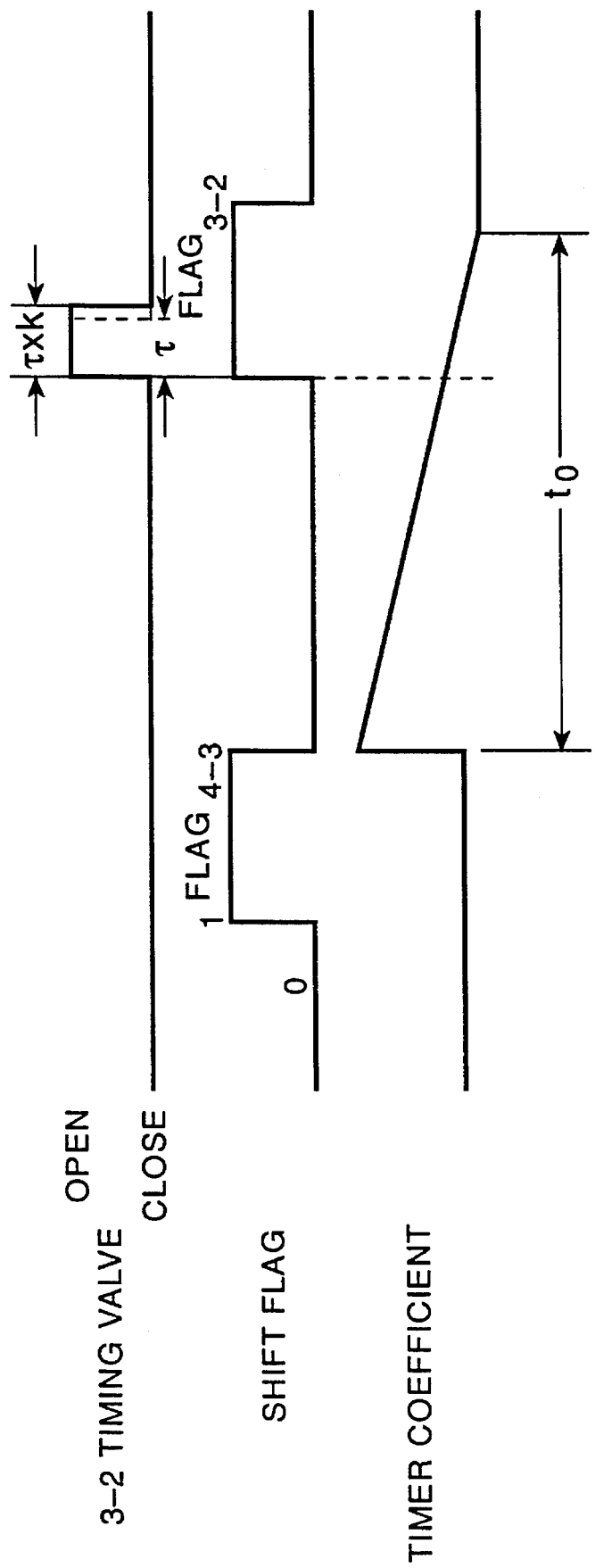
FIG. 20 is a timing chart representing operation of the 32 timing valve of the gear shift control system in accordance with another preferred embodiment of the present invention.

Accordingly, when a continuous 4-3-2 shift down from the fourth gear to the second gear via the third gear is quickly invoked within the specified period of time to, the specified speed-up time period τ for speeding up locking of the second brake 19 is multiplied by the calibration coefficient K (K≧1) corresponding to the brevity of this continuous shift-down, i.e., τ=τ×K. The resulting time becomes longer than the time during the 3-2 shift-down indicated by a dotted line in FIG. 20. Even during this continuous shift-down, therefore, turbine speed shooting-up and slumping are effectively inhibited or prevented, and shift shocks are effectively alleviated or eliminated.

Figure 21:
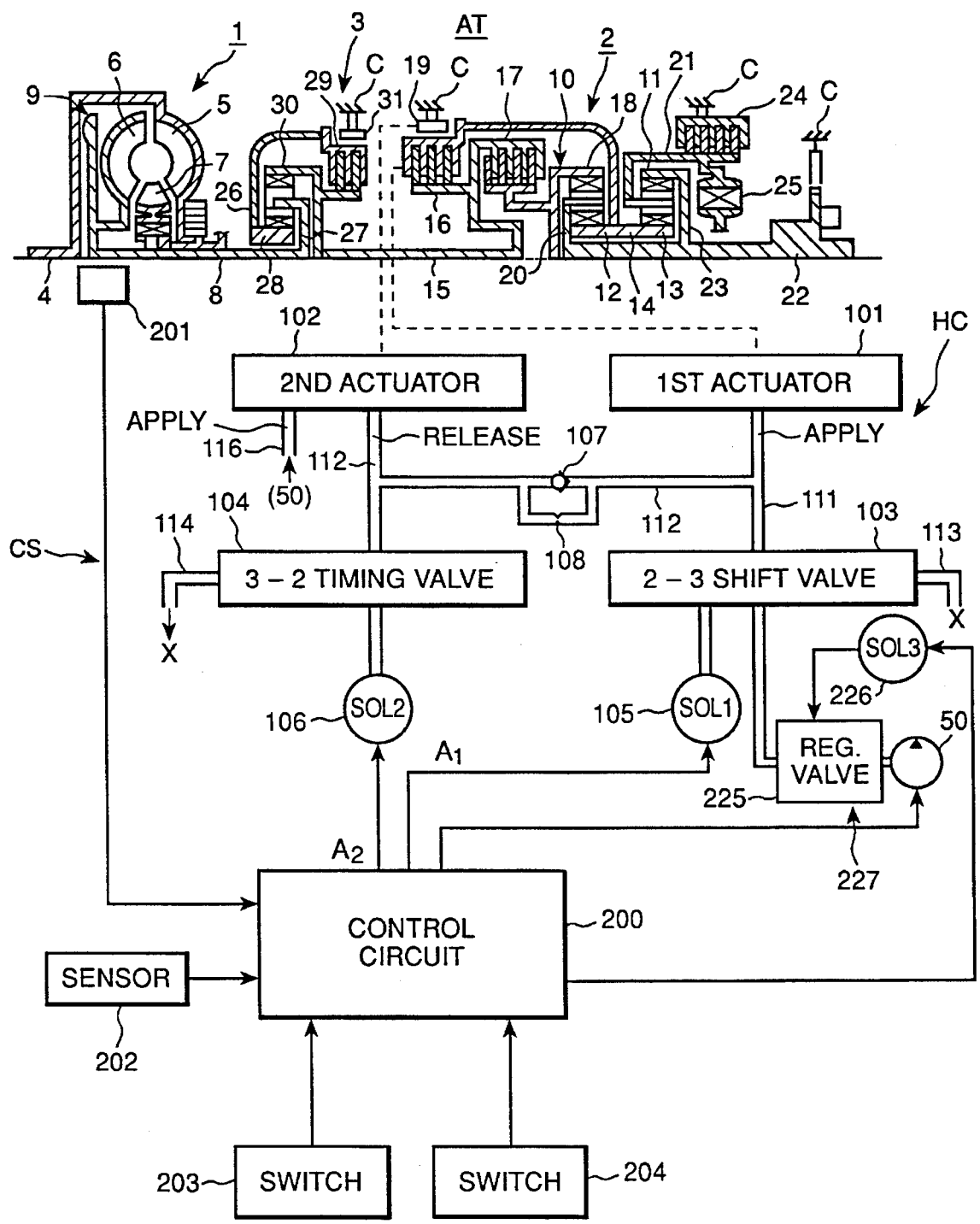
FIG. 21 is a schematic illustration of an automatic transmission cooperating with a gear shift control system in accordance with still another preferred embodiment of the present invention.

Referring to FIG. 21, a shift control system in accordance with another preferred embodiment of the present invention is shown. In place of the calibration of the specified speed-up time period τ for speeding up of locking, the line pressure to the actuator 102 for the second brake 19 is regulated in accordance with the time of a continuous 4-3-2 shift-down from the fourth gear to the second gear via the third gear.

Specifically, the hydraulic circuit includes a duty solenoid 226 for a pressure regulator valve 225. The pressure regulator valve 225 regulates a line pressure by controlling the pressure from the hydraulic pump 50 when the duty solenoid 226 receives a duty control signal L from a control circuit 200. This duty control signal L is controlled in accordance with the shift period or time of a continuous shift-down from the fourth gear to the second gear via the third gear. The line pressure supplied into a pressure line 111 is adjusted to a level lower than the normal level when the shift period is relatively short within the specified period of time to, and to a level slightly higher than the normal level when the shift period or time is relatively long within the specified period of time to. The pressure regulator valve 225 and duty solenoid 226 constitute a line pressure alteration means for altering the line pressure of the hydraulic circuit in accordance with the shift period between 4-3 and 3-2 shift-down measured by a period measurement means.

Accordingly, during a continuous 4-3-2 shift-down from the fourth gear to the second gear via the third gear, if a 3-2 shift-down occurs within the specified period of time to after the completion of a 4-3 shift-down, a locking pressure is supplied into the direct clutch 29 so as to form the third gear for completing the transitional shift-down from the fourth gear to the third gear. Consequently, an unlocking pressure is supplied into the release pressure chamber 63 of the actuator 102 for the second brake 19. As was previously described, the following problem is inevitable due to the necessity of a large volume of hydraulic oil. That is, if the 3-2 shift-down is invoked under a slumped line pressure in the pressure line 111, the locking pressure of the front clutch 16 is released more quickly than usual. Therefore, even if the unlocking pressure of the second brake 19 is released at an ordinary speed, the turbine speed of rotation tends to shoot up. Accordingly, it becomes difficult to contingently and properly calibrate the speed for accelerating the release of the unlocking pressure of the second brake 19 (i.e., the specified speed-up time period τ for speeding up the locking of the second brake 19).

However, according to the shift control system of this invention, the line pressure of the pressure line 111 is controlled at a high level by the pressure regulator valve 225 and duty solenoid valve 226 during a continuous shift-down from the fourth gear to the second gear via the third gear, so as to perform releasing of the pressure for locking the front clutch 16 in a normal fashion. Proper calibration of the specified speed-up time period τ for speeding up locking of the second brake 19 as usual is thereby effected.

The shift control system of this invention may be modified so as to take various forms in addition to the embodiments which have been described in detail above. Specifically, the control circuit 200 may be configured by using a computer, such as a digital computer or an analog computer. The specified speed-up time period τ shown in FIG. 5 may be calibrated by using, as a parameter, a factor, such as the temperature of working oil, which affects shift shocks. Furthermore, the calibration time or value Δτ may remain accessible immediately after another engine ignition by an ignition key. In this instance, the calibration time or value $\Delta\tau$ may be memorized in a non-volatile memory, i.e., RAM, and otherwise in a ROM backed up with the use of a separate power source, in which the basic time or value $\tau$ is memorized. The transmission gear mechanism 2 may take any form well known to those in the art.

It is to be understood that although the present invention has been described in detail with respect to the preferred embodiments thereof, various other embodiments and variants may occur to those skilled in the art..Any such other embodiments and variants which fall within the scope and spirit of the present invention are intended to be covered by the following claims.

What is claimed is:

1. A shift control system for an automatic transmission including a transmission gear mechanism having a plurality of frictional elements which are selectively locked and unlocked by a hydraulic circuit so as to selectively shift said transmission gear mechanism into a plurality of gears, said shift control system comprising:

speed sensing means for monitoring an input speed of rotation of said transmission gear mechanism;

regulating means disposed in said hydraulic circuit for regulating a locking speed at which locking of a specific one of said frictional elements is performed so as to shift said transmission gear mechanism to a specific one of said gears; and control means for controlling said regulating means during a gear shift, for calibrating said locking speed in accordance with a deviation of said input speed of rotation from a specified input speed of rotation of said transmission gear mechanism while shifting said transmission gear mechanism to said specific gear, for detecting a transitional period of time from a completion of shifting of said transmission gear mechanism to a preceding gear, from which said transmission gear mechanism is shifted directly to said specific gear, to a commencement of shifting of said transmission gear mechanism to said specific gear subsequently to said shifting of said transmission gear mechanism to said preceding gear, and for varying said calibrating according to said transitional period of time.

2. A shift control system for an automatic transmission including a transmission gear mechanism having a plurality of frictional elements which are selectively locked and unlocked by a hydraulic circuit so as to selectively shift said transmission gear mechanism into a plurality of gears, said shift control system comprising:

speed sensing means for monitoring an input speed of rotation of said transmission gear mechanism; regulating means disposed in said hydraulic circuit for regulating a locking speed at which locking of a specific one of said frictional elements is performed so as to shift said transmission gear mechanism to a specific one of said gears; and control means for controlling said regulating means so as to speed up said locking of said specific one of said frictional elements for a specified period of time, for calibrating said specified period of time in accordance with a deviation of said input speed of rotation from a specified input speed of rotation of said transmission gear mechanism while shifting said transmission gear mechanism to said specific gear, for renewing said specified period of time with said calibrated specified period of time for another shifting of said transmission gear mechanism to said specific gear, for detecting a transitional period of time from a completion of shifting of said transmission gear mechanism to a preceding gear, from which said transmission gear mechanism is shifted directly to said specific gear, to a commencement of shifting of said transmission gear mechanism to said specific gear subsequently to said shifting of said transmission gear mechanism to said preceding gear, and for alternately varying said calibrating of said specified period of time and prohibiting said calibrating of said specified period of time according to said transitional period of time.

3. A shift control system as defined in claim 2, wherein said control means prohibits said calibrating of said specified period of time when said transitional period of time is shorter than a predetermined period of time.

4. A shift control system as defined in claim 2, wherein said control means varies a corrective time for said calibrating of said specified period of time when said transitional period of time is longer than a predetermined period of time.

5. A shift control system as defined in claim 3, wherein said control means varies a corrective time for said calibrating of said specified period of time when said transitional period of time is longer than a predetermined period of time.

\* \* \* \* \*